United States Patent [19]

Pezzolo et al.

[11] Patent Number: 4,521,843

[45] Date of Patent: Jun. 4, 1985

[54] PROGRAMMABLE WALL SWITCH FOR CONTROLLING LIGHTING TIMES AND LOADS

[75] Inventors: Donald E. Pezzolo, Cupertino; James W. Pfeiffer, Santa Clara; Thomas E. Corder, Martinez, all of Calif.

[73] Assignee: Intermatic Incorporated, Spring Grove, Ill.

[21] Appl. No.: 408,330

[22] Filed: Aug. 16, 1982

[51] Int. Cl.[3] ............... G01R 21/00; G06F 15/06
[52] U.S. Cl. ............................. 364/145; 364/146; 364/569; 340/309.15; 368/155; 307/41; 315/360
[58] Field of Search ........... 364/143, 144, 145, 569; 315/360; 368/155, 156; 307/139, 140, 141, 39, 40, 41; 340/309.15, 309.04, 309.06

[56] References Cited

U.S. PATENT DOCUMENTS

| | | | |
|---|---|---|---|
| 3,903,515 | 9/1975 | Haydon et al. | 364/145 X |
| 4,047,375 | 9/1977 | Wulff | 368/109 |
| 4,071,745 | 1/1978 | Hall | 364/145 |
| 4,104,541 | 8/1978 | Jewell | 368/155 X |
| 4,151,515 | 4/1979 | Pease et al. | 307/141 X |
| 4,200,910 | 4/1980 | Hall | 364/145 |
| 4,213,182 | 7/1980 | Eichelberger et al. | 364/145 X |
| 4,259,618 | 3/1981 | Nilssen | 307/140 X |
| 4,279,012 | 7/1981 | Beckedorff et al. | 364/145 |
| 4,293,915 | 10/1981 | Carpenter et al. | 364/145 X |
| 4,303,867 | 12/1981 | van der Meulen | 315/360 |
| 4,328,539 | 5/1982 | Heeger | 364/144 |
| 4,354,120 | 10/1982 | Schornack | 340/309.15 X |
| 4,368,408 | 1/1983 | Marcus | 364/145 X |
| 4,409,649 | 10/1983 | Heeger | 364/144 |
| 4,418,333 | 11/1983 | Schwarzbach et al. | 340/825.07 X |

*Primary Examiner*—Jerry Smith
*Assistant Examiner*—Allen MacDonald
*Attorney, Agent, or Firm*—Alan H. MacPherson; Steven F. Caserza; Richard Franklin

[57] ABSTRACT

A programmable wall switch for controlling the time for turning on and for turning off an incandescent light includes a rectifying circuit for producing from the AC power line a selected DC voltage. The switch includes a microprocessor powered by this DC voltage for turning on a light at any one of several selected times and for turning off the light at one of an additional corresponding several selected times. A time display is provided for displaying the time as well as for allowing a user to review the programmed status of the switch at any one of several selected times. A signal is generated at each zero crossing of the AC power line which is supplied to the microprocessor. The microprocessor produces output signals which turn on, turn off or dim the light at selected times. The ability of the microprocessor to dim the light further enhances the appearance of human occupancy when the switch is used to simulate occupancy of a vacant building.

17 Claims, 11 Drawing Figures

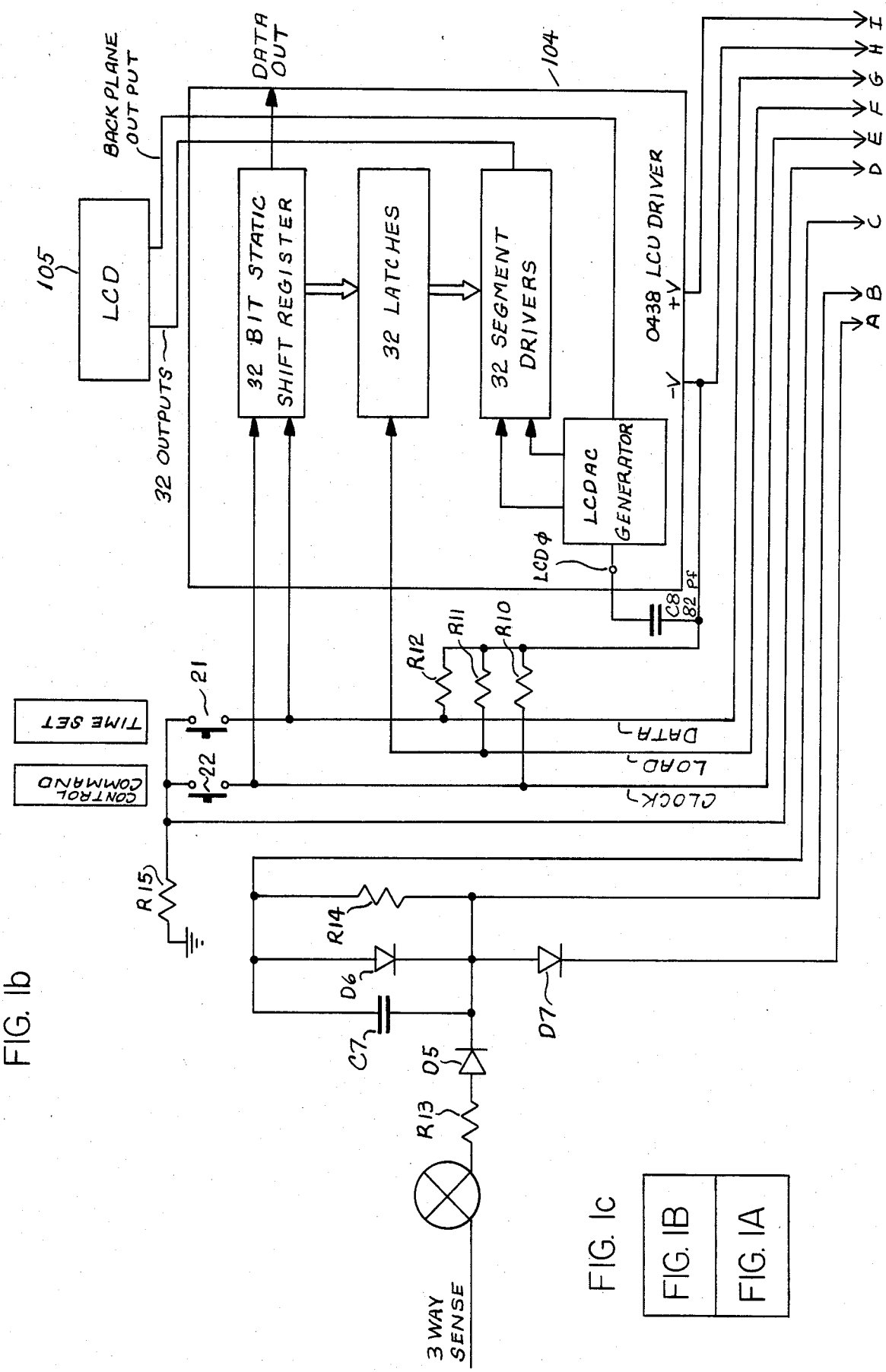

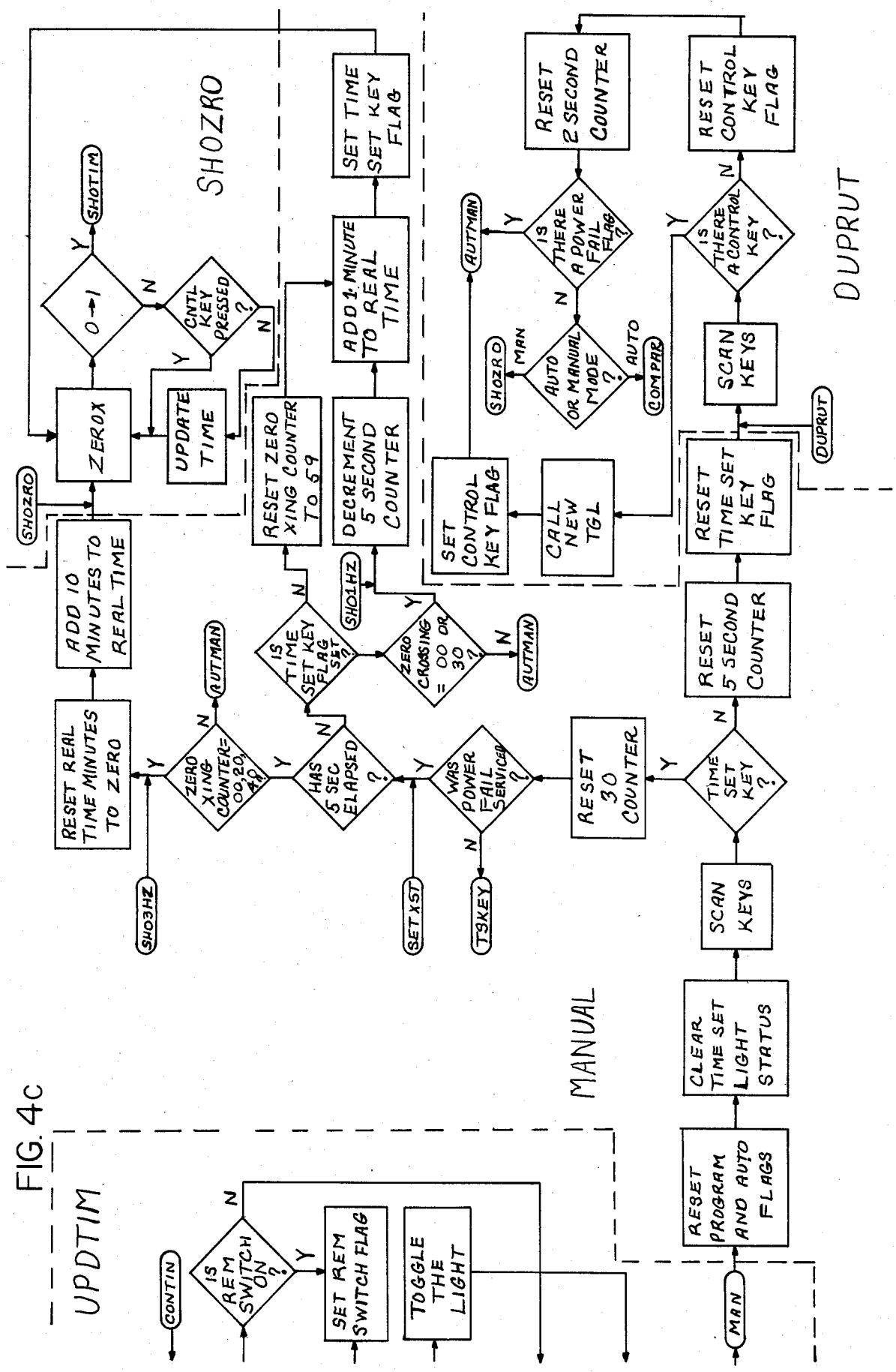

COMPAR

PROGRAMMABLE WALL SWITCH FOR CONTROLLING LIGHTING TIMES AND LOADS

BACKGROUND OF THE INVENTION

1. Field of the Invention

This invention relates to light switches and in particular to a light switch which is capable of being programmed by the user to turn on in response to selected times, as well as to provide automatic dimmer control.

2. Prior Art

The use of timers for turning on and off lights to simulate the occupancy of rooms and homes is well-known. Numerous patents have issued describing such structures. Thus, U.S. Pat. No. 3,979,601 issued Sept. 7, 1976 dicloses a combination dimmer and timer switch mechanism which is capable of turning on and off the power to a receptacle in accordance with a predetermined time switch. U.S. Pat. No. 4,151,515 issued Apr. 24, 1979 discloses a similar structure which not only reduces energy consumption by turning lights off after business hours but also cycles lights in a predetermined manner to discourage burglaries. These structures are limited in that the pattern set for one day repeats on adjacent days unless the system is reset daily. Accordingly, the very system designed to give the appearance of occupancy can, by its precise repetitiveness, indicate that the building is not occupied.

In addition, occupants of buildings typically do more than merely turn on and off lights. Accordingly, prior art programmable switches have been limited in their ability to accurately simulate the occupancy of a building.

SUMMARY OF THE INVENTION

This invention overcomes certain of the disadvantages or prior art timed switches by providing a swith which is user-programmable and capable not only of controlling a light but, in addition, of automatically dimming the light in accordance with a program, whether or not a building is occupied. The programmable switch of this invention possesses several functions such as time-keeping, dimmer control, power supply and power control, and provides user inputs and an LCD display.

In accordance with this invention, a user-programmable module is provided which is, in the preferred embodiment, microprocessor controlled and which includes a real time display. The system provides a program interval between an ON signal and an OFF signal of 30 minutes with a variable ON/OFF capability to make the ON/OFF commands appear random. The system is structured so that the settings can be reviewed by the user and the program modified or cleared as desired. The system is also structured to operate either in the manual or automatic mode with a manual override being provided. The system is capable of acting as a dimmer and provides a display which indicates system status (such as load, ON/OFF/DIM and programming). The display also indicates AM and PM.

As a feature and for ease of installation and maintenance, no grounding is provided and an air gap switch is provided to turn off the module and lamps for installation and service.

As a further feature, the switch is designed to maintain memory and program in power failure for at least 50 milliseconds minimum, thereby removing the sensitivity of prior art programmed switches to temporary power failures of a type all too common.

As a special feature of the invention, the display shows "PF" when the switch installed or after power failure. PF is deleted and time is displayed when real time is set.

An ON/OFF switch, preferably air gap, is provided to isolate power from the unit when OFF. Program memory and real time are cleared when the switch has been turned OFF for approximately one second. The switch has three positions: OFF, manual and automatic.

A time-set button is also provided for setting the real time and advancing times for ON/OFF/DIM programming.

Of particular utility is a command button which is used to manually turn a light ON/OFF/DIM, to enter ON/OFF/DIM commands during programming, and to dim the light to one-half intensity when pressed and held for greater than a selected time, typically two seconds. The particular dimming method used is selected to minimize radio frequency interferece. The module replaces an ordinary single pole wall switch and uses a standard outlet box and wall switch plate. Power and timekeeping base are derived from the line signal (typically sixty (60) hertz and 110 volts).

This invention will be more fully understood in conjunction with the following detailed description taken together with the attached drawings.

DESCRIPTION OF THE DRAWINGS

FIGS. 1a and 1b illustrate the system diagram for the switch;

FIG. 1c shows the relationship between FIGS. 1a and 1b;

FIGS. 4a, 4b, 4c and 4d illustrate software flow charts used with this invention.

DETAILED DESCRIPTION

Figure 1A:
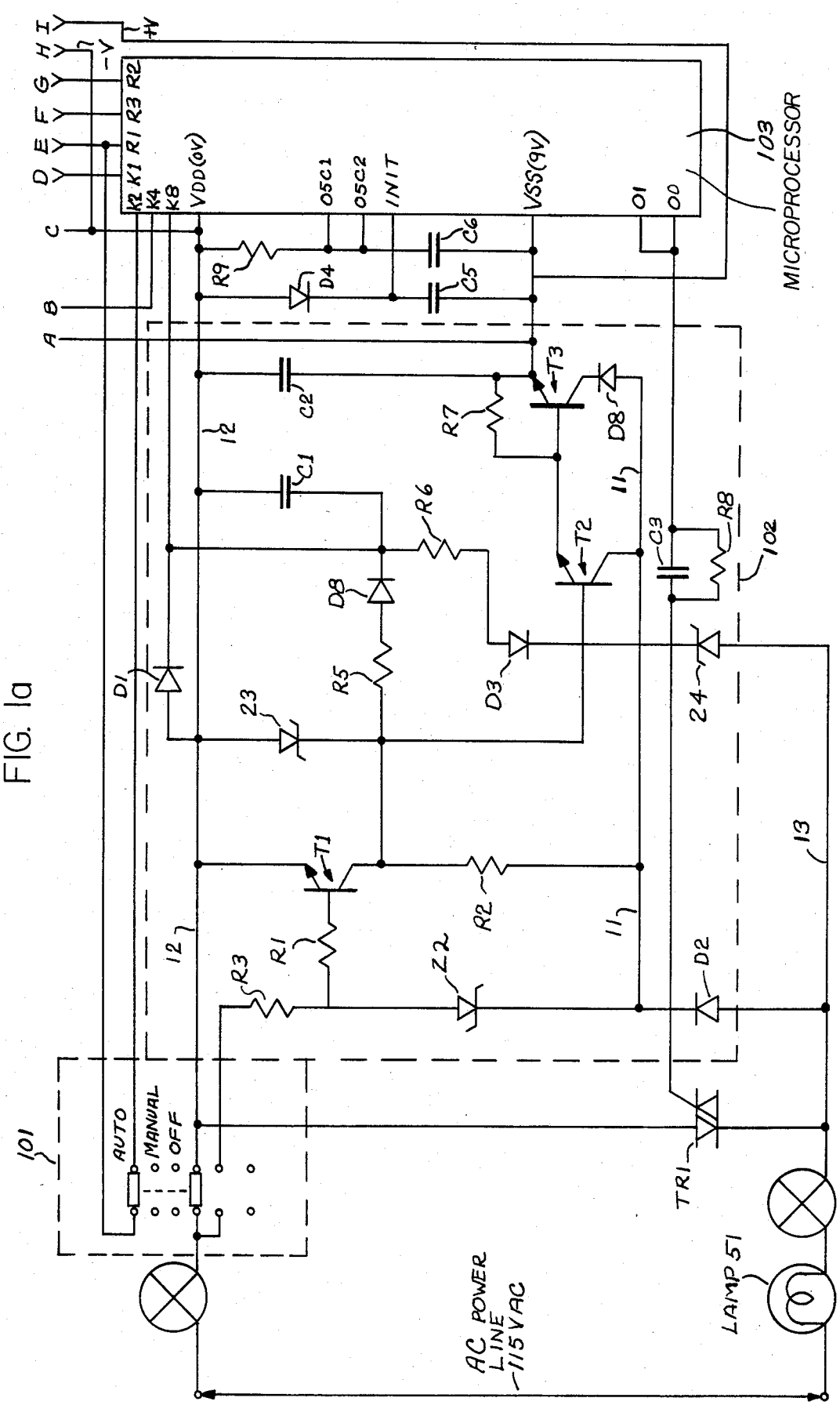

The overall system is illustrated in FIGS. 1a and 1b. The system as shown in FIG. 1a divided into four main blocks together with ancillary components and certain command and input switches. Thus, block 101 illustrates the three position slide switch 10 capable of assuming automatic, manual and OFF positions. Block 102 illustrates the novel synchronous rectifier and regulator of this invention suitable for producing a fixed output voltage of about 9.5 volts required to drive the selected microprocessor 103. Microprocessor 103 in the preferred embodiment comprises the four bit TMS 1000 manufactured by Texas Instruments. This specification is not meant to be limiting. Other embodiments will become obvious to those skilled in the art. Microprocessor 103 produces output signals which are then used to control the state of display driver 104 which drives display 105. Display 105 is, in the preferred embodiment, a liquid crystal display.

The circuitry of regulator 102 is shown in detail in FIG. 1 a. An input signal which typically comprises the AC line signal of 60 cycles and 115 volts (hereinafter called the "AC power line") is applied across lines 12 and 13 through the lamp load 51 and switch 101 and then through diode D2 (1N4003) to zener diode Z2, (BZX-83C91) normally rated at about 91 volts. Zener diode Z2 is back-biased relative to ground and its cathode is conneced to $V_{SS}$ bus 11 (held at about nine volts) to which are connected one terminal of resistor R2 and the collectors of transistors T2 and T3 (shown as NPN transistors).

Figure 2A:
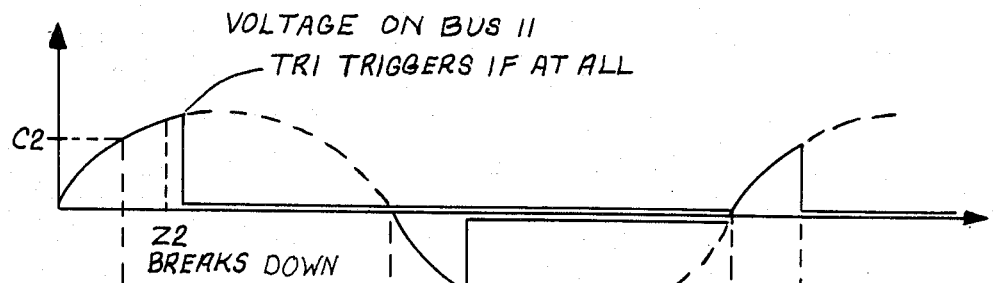
FIG. 2a illustrates the normal triac triggering waveform and FIG. 2b illustrates the waveform associated with the zero crossing circuit in accordance with this invention.

As the signal on line 13 rises, current flows through diode D2 and resistor R2 to the base of transistor T2, thereby turning on transistor T2. The emitter current from transistor T2 then flows to the base of transistor T3, thereby turning on transistor T3. Resistor R7 (470K ohms) is used to shunt the ICBO leakage current around transistor T3 to avoid temperature induced thermal runaway. The emitter current from transistor T3 charges capacitor C2. When capacitor C2 reaches the desired voltage level of about 9.5 volts relative to ground $V_{DD}$ (bus 12), zener diode Z3 (BZX-83C11) breaks down and thereby limits the voltage to which capacitor C2 is charged to 9.5 volts. Zener diode Z3 breaks down at approximately 9.5 volts plus two voltage drops across two forward-biased PN junctions, or at about 10.7 volts. FIG. 2a shows the voltage level C2 on capacitor C2 at which zener diode Z3 breaks down. The current through resistor R2 also passes through zener diode Z3 as well as maintaining the charge on capacitor C2 at about 9.5 volts. As the input voltage continues to rise, ultimately the voltage across zener diode Z2 breaks down zener diode Z2. Z2 is selected to break down at about 91 volts. Accordingly, when Z2 breaks down, the voltage drop across resistor R3 turns on transistor T1 through base resistor R1. T1 then saturates, thereby dropping its collector voltage substantially close to ground. Thus, transistors T2 and T3 are shut off. Capacitor C2 maintains the voltage at approximately 9.5 volts for the remainder of the cycle. Capacitor C2, which is 470 microfarads, serves as the power source for the microprocessor and discharges current of about 10 milliamps into the microprocessor. Circuit 102, called a synchronous rectifier, is activated once each cycle of the input signal.

The synchronous rectifier 102 is self-starting (that is, has no lock up modes) and charges capacitor C2 fairly rapidly with current from transistors T2 and T3. Capacitor C2 is fully charged each cycle before triac TR1 is turned on (TR1 is turned on at most once per cycle of the line signal on lead 13) thus ensuring that capacitor C2 is fully charged once each cycle regardless of the state of triac TR1. The microcomputer 103 is programmed to ensure that triac TR! is not turned on before capacitor C2 is charged to about 9.5 volts. Thus, the voltage on capacitor C2 drops no more than 300 millivolts between charging cycles but during the initial part of the power cycle the current from transistors T2 and T3 rapidly replenishes that charge which has been drawn from capacitor C2 to run the microprocessor. The power circuit typically reaches 90 volts in about 800 microseconds or 0.80 milliseconds. Because the cycle time of a 60 cycle current is 16.67 milliseconds, the circuit is on only for less than about 1/20th of the total cycle time. Accordingly, very little heat is dissipated in the circuit. Because this unit is mounted in a wall socket box, there is no efficiency way to remove heat from this container and thus a low duty cycle for the power supply is important.

Figure 2B:
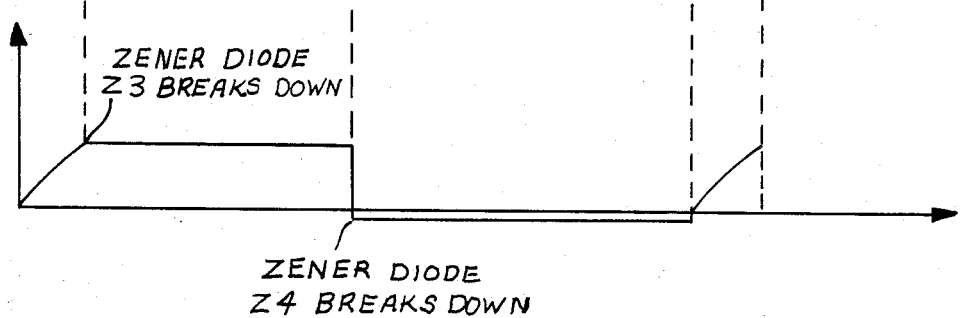

Another circuit used in the structure of this invention and shown in FIG. 1a within the boundary 102 extends the pulse normally generated in a zero crossing triggering circuit used for triggering a triac for substantially a half cycle (as shown in FIG. 2b). This circuit takes the positive half cycle of the waveform on line 13 (FIG. 1a) and uses this information to generate a full cycle of timing information. The input signal on line 13 typically comprises a 115 VAC, 60 cycle line signal. The signal is applied through diode D2, resistor R2 and resistor R5 to the input of diode D8 (FIG. 1a). On the positive half cycle, diode D8 is forward-biased, thereby charging capacitor C1. The signal on capacitor C1 increases to a peak magnitude of about 10.5 volts as controlled by the breakdown voltage of zener diode Z3. Capacitor C1 stores this peak amplitude. Typically, C1 is about 0.01 microfarads. The input line voltage (which is AC) continues to increase in the first quarter of the cycle and then drops in the second quarter of the cycle and for the last half of each cycle goes negative. As the input line voltage drops, diode D8 becomes reverse-biased, thereby trapping on capacitor C1 the charge previously stored on this capacitor. As the input voltage drops toward zero volts, diode Z4 (which is connected through diode D3 and resistor R6 (100K ohms) to the non-grounded plate of capacitor C1 and thus is reverse biased once the voltage on C1 is above the voltage on line 13) will break down when the voltage on capacitor C1 is above the voltage on line 13 by the breakdown voltage of the zener diode Z4. This is designed to occur just after the input voltage on line 13 goes negative. When this occurs, the charge stored on capacitor C1 discharges through zener diode Z4 back to the signal source. Diode D1 (connected between $V_{DD}$ (zero volts) and the non-grounded side of capacitor C1) the forward-biases to clamp the non-grounded plate of capacitor C1 to a voltage slightly beneath ground. Diode Z4 stays broken down until the input signal on line 13 goes positive at which time diode D8 again conducts in its forward-biased direction until capacitor C1 is again charged to the breakdown voltage of zener diode Z3 during the next cycle of input current. Note that diode D3 is connected to present a low impedance when the voltage on the non-grounded plate of C1 is above the voltage on line 13 and a high impedance otherwise. The voltage on the positive plate of capacitor C1 as a function of time is shown in FIG. 2b. This figure illustrates how two zero crossings are produced each cycle of the signal on line 13 using only the information contained in the first half of each cycle.

During normal operation of the light 51 (i.e. during the times when the light is to have substantial current flowing through it so as to turn on the light), triac TR1 is turned on by a pulse from microprocessor 103 in a well-known manner once each cycle just after zener diode Z2 breaks down, thereby to provide a low impedance path for the load current from the voltage source (line 13) through triac TR1.

Figure 3:
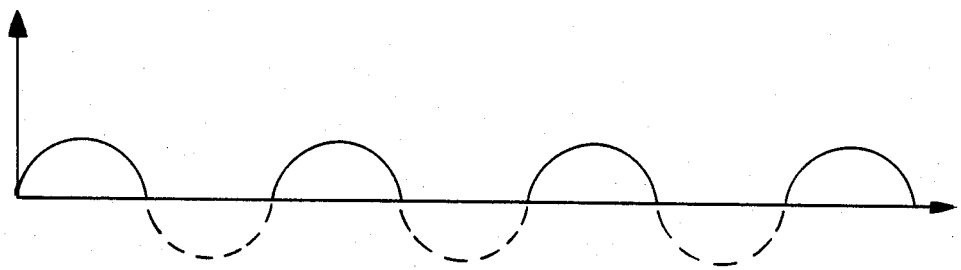
FIG. 3 illustrates a waveform generated by the skip cycle method of dimming the light to one-half its normal intensity to avoid radio frequency interference.

When it is desired to dim the load, the pulse which turns on triac TR1 is delayed one-half ($\frac{1}{2}$) cycle (i.e., the turning on of triac TR1 is "skipped" for one-half ($\frac{1}{2}$) cycle) thereby to allow power to flow through the load only during one-half of each cycle. Consequently, the light intensity can be varied from full ON to one-half ($\frac{1}{2}$) ON. This variation provides an extra degree of live-in authenticity (particularly when this dimming is randomly programmed in microprocessor 103), saves energy and extends light bulb life. This technique generates the waveform shown in FIG. 3 wherein the solid line indicates the portion of time during which triac TR1 is off thereby generating a positive half-cycle of voltage across the regulator circuit and the dashed line indicates when triac TR1 is turned on during the negative half-cycle thereby to allow current to flow through the load. Another advantage of this technique is that the even harmonics of power flowing through the load substantially eliminate the radio frequency interference associated with standard prior art dimming circuits. Skipping more than every other half cycle causes flicker in the light and thus is to be avoided.

As a feature of this invention, triac TR1 triggers about 800 microseconds after the zero crossing of the signal on line 13. The TMS1000 microprocessor 103 sees the zero crossing approximately 100 microseconds after it has occurred. The TMS1000 is then programmed to trigger triac TR1 about 700 microseconds after it sees the zero crossing. The triac TR1 triggers after zener diode Z2 breaks down. However, the triggering of triac TR1 is not related to the breakdown of zener diode Z2.

A parallel RC network comprising capacitor C3 and resistor R8 is added in the line between the "01" and "00" output leads from microcomputer 103 and triac TR1. Until the system power turns on and a "INIT" pulse has been generated, it is not desired to have triac TR1 turn on. Thus, capacitor C3 and resistor R8 provide a differentiator so that triac TR1 is prevented from being held on if the state of the 00 and 01 output leads from microprocessor 103 is "on" when microprocessor 103 is turned on. If this occurs triac TR1 is held on only for eight milliseconds and the circuit thereafter operates correctly.

The capacitor C5 together with internal circuity in the TMS1000 creates a delay of about one second during start-up to allow microprocessor 103 to be properly reset during the power-up portion of the operation of the system. Capacitor C6 and resistor R9 form a standard RC oscillator for providing clock signals to microprocessor 103. Resistors R10, R11 and R12 are standard pull-down resistors. Diodes D6 and D7 clamp the sensed input voltage to either $V_{DD}$ or $V_{SS}$. D5 in conjunction with capacitor C7 stretches the zero crossing signal so the microcomputer 103 can sense its state even if triac TR1 has ben turned on.

The system of this invention is suitable primarily for turning on an incandescent lamp rather than an appliance because the triac TR1 creates a net DC voltage which would heat any motor used to run a typical appliance. Accordingly, the circuit is primarily suitable mainly for an incandescent light or a similar type structure. Note that the timing circuit does not use the voltage drop across the load element but rather a voltage spike to charge the capacitance C2 and thereby provide the drive voltage to run the microcomputer. The lamp 51 is in series with the load created by the structure of circuit 102, microcomputer 103, liquid crystal display driver circuit 104 and liquid crystal display 105. The current continuously flows through lamp 51 in accordance with this invention but at such a low level then triac TR1 is not triggered on as to prevent lamp 51 for lighting. The combination of the capacitor C2 and load 51 creates a time constant which must be carefully sized to allow the voltage across capacitor C2 to reach 9.5 volts. Thus, zener diode Z3 controls the height of the voltage across capacitor C2 while the width of the voltage pulse before triac TR1 turns on is controlled by the line voltage on line 13 before zener diode Z2 breaks down thereby turning on transistor T1. As the lamp 51 increases in impedance reflecting a lower wattage rating, the time constant associated with the circuit as shown in FIG. 1a increases. The system shown in FIG. 1a can work with an incandescent light bulb as low as 40 watts. Otherwise, the system takes too long to charge capacitor C2 to the desired operating voltage of microprocessor 103.

The programmable wall switch of this invention has two modes of operation, manual and automatic. In the automatic mode, the switch turns lights on and off at the preprogrammed times. In the manual mode, it operates as a regular light switch without disturbing the previously inserted program. The wall switch can even be operated manually when it is in the automatic mode.

The programmable wall switch can be programmed to turn lights ON, DIM or OFF up to eight (8) times per day. By programming in DIM as well as ON and OFF settings, the house containing the programmable wall switch appears even more lived in while the owners are away than with a standard prior art type automatic switch.

The programmable wall switch has a variable time feature further described below in connection with the Software Program, that turns the lights on and off at varying times up to ten minutes after the program time. This creates a randomness in the turning on and off of lights which further heightens the appearance of occupancy and thus further discourages any intruder who may be observing a house containing the wall switch.

If power fails, the programmable wall switch of this invention will lose its memory. When the power is restored, the wall switch will turn the light on until the occupant turns it off. The display will read "PF" after a power failure. Whenever a light bulb controlled by the programmable wall switch burns out, the programmable wall switch loses its memory and the display will go blank. This reflects the fact that the power for operating the display and the programmable wall switch of this invention is derived from a current which passes through an incandescent light bulb. However, the current pulse which is used to power this light exists for only a very short interval (typically about 800 microseconds) and therefore the total average current over a given cycle when the light is off is very small. As the wattage on the blub decreases, this average current becomes smaller.

Whenever a light bulb connected in series with the programmable wall switch of this invention is changed, the pre-position slide switch 101 must be placed in the OFF position so that there is no power to the socket. After changing the light bulb the programmable wall switch of this invention must be reprogrammed.

As a feature of this invention, the regulator for supplying power to operate the microprocessor is charged during the first fractional portion of each cycle of line current before the triac TR1 is turned ON each cycle to activate the load 51. Accordingly, the line current is used to supply power to the microprocessor and timer. Because the microprocessor is located in the normal light switch receptacle or box, which is a relatively poor dissipator of heat, it is important that the system dissipate very little power. The current flowing in the electronic circuitry of this invention and in the regulator to charge capacitor C2 flow for less than 1/20th of each cycle of the line current. Accordingly, very little power is dissipated in this circuit and there is very little heat to be removed from the structure. This also extends the life of the circuit components.

The programmable wall switch of this invention (hereinafter referred to as "PWS" or the "system") is operated in the following manner. When the switch 101 (FIG. 1a) is in the automatic or manual mode, the LCD display 105 (which functions as a digital clock among other things and which is shown in FIG. 1b) will show "PF" (indicating power failure) immediately after installation, after a power failure, or after clearing a program. To set the time clock (i.e., to set the liquid crystal display 105) the automatic manual OFF slide switch 101 (FIG. 1a) is placed in manual (center) position. The time set button 21 (FIG. 1b) is depressed for at least two seconds. The LCD display will then reset to 12:00 P.M. (noon). To then set the time correctly, the time set button 21 is continuously despressed to advance the LCD display 105 to the proper time. The microprocessor 103 constantly strobes the leads G and E (FIGS. 1a, 1b) and then tests the node between resistor R15 and either button 22 or button 21 to measure the voltage on this node. If this voltage is high and a pulse has been applied to the "G" lead, then the microprocessor knows that switch 21 has been closed. If the signal on lead E is high level and the microprocessor tests a high level voltage on the node between switches 21 and 22 and resistor R15, then the microprocessor knows that switch 22 has been closed. If both switches are closed simultaneously, whichever switch is interrogated first by the microprocessor will be interpreted by the microprocessor as being activated and the microprocessor will then behave accordingly. The continued holding closed of time set switch 21 advances the time display on LCD display 105 to the desired time. At this instant, the switch 21 is released and the clock no longer is advanced. To minimize the time required to program the switch, a two-speed advance is used. First, time advances slowly (in one minute increments) and then speeds up after a selected time (typically five (5) seconds) to advance in ten minute increments. To set the correct time, the time switch 21 must be released before reaching the desired time and then depressed again to advance at the slower rate in one minute increments to the correct time. Each press of the time set button 21 will advance the clock one minute. When the correct time is reached, the programmable wall switch is then ready to be programmed. The programmable wall switch can not be programmed until a real time is set.

During programming, the programmable wall switch does not actually turn the light on or off. This is a special feature to help the user program the PWS in dark areas such as halls, cellars, attics or in the evening. Before programming begins, the light should be turned on if necessary to allow the user to see the PWS. The light will then stay on during programming. The light is turned on by pressing command button 22 (also called "control" button 22 or "switch" 22) before the PWS is placed in the "program" mode.

To start programming, the automatic, manual OFF switch 101 is placed in the automatic (upper) position. The time set switch 21 is pushed and held at least two seconds. The clock (LCD display 105) will reset to 12:00 P.M. and another indicator on the clock will show that the system is in the "program" mode and that the programmed state of the light is off even if the light is actually on. This is an important feature of this invention because the wall switch allows the light to remain on while the display indicates the status of the light as a function of the times which are being programmed by the user. Thus, the user will read on the display whether at a given time the light is to be ON, OFF or DIM while the light remains on to allow the user to continue the programming. In programming, the time set button 21 is held to advance to the first desired time. The LCD display 105 will indicate this time. The clock advances in 30 minute increments. To stop the advance, the time set button 21 (also called "switch" 21) is released before reaching the desired time and the clock is then advanced slowly by appropriately pressing and releasing the time set button 21. The desired event to occur at the time is then entered into memory by pressing the command button 22 at least once. The PWS then will turn "ON", "OFF" or "DIM" (if button 22 is held for two seconds). In sequence as indicated on the display after the control button 22 is pressed and released. For example, when switch 22 is pressed once, if the light at this time is OFF, the unit will interpret the command as an instruction to turn ON the light at the time then shown in LCD display 105. If the command button 22 is pressed twice, the system will interpret this as a signal to turn OFF the light at the time displayed and if the signal is pressed three times, the system will interpret the three presses as a command to turn ON the light at the time indicated. The prompt on the display changes in sequence from ON to OFF with each pressing so that the user can visually see as part of the display the particular command which is being entered into the programmable wall switch. If the user completes two presses and then decides that the light should be turned OFF rather than ON at this time, pressing command switch 22 again begins the instruction cycle over again. DIM is programmed by depressing command button 22 once or twice until the indicator shows OFF and then depressing and holding command button 22 for at least two seconds unitl DIM shows on the display. Time set button 22 is then pressed again and the above steps are repeated to program in up to eight different ON, OFF or DIM time sets.

If the program memory is exceeded, that is, if the user tries to program in a ninth setting, the display will show "EEE" indicating error. The first eight times entered into memory will not be affected.

After the desired times and events are entered into the memory, the clock will reset to the correct real time in thirty seconds and begin automatic operation. Returning the auto/manual off switch 101 to manual will reset the time displayed on LCD display 105 immediately to the correct time.

The user then selects the automatic or manual mode of operation. If the automatic mode of operation is selected, the unit will then turn ON, turn OFF, or DIM the light automatically in accordance with the preset program. If the manual mode of operation is selected, the unit will then respond merely to the user turning the light on or off by pressing the command button 22. One feature of this invention is that the user can always override the automatic mode of operation by pressing the command button 22. If the light is on, pressing command button 22 will turn it off. If the light is off, pressing command button 22 will turn it on. Holding the command button for two seconds will dim the light.

To review the program already placed in the wall switch, the automatic/manual/off switch is placed in automatic (upper) position. The time set switch 21 is then pressed and held down for at least two seconds. The clock 105 then resets automatically to noon, 12:00

P.M. By then continuing to hold the time set switch 21 down, the clock is advanced in thirty minute increments. The clock will stop at the first program time and show ON, OFF or DIM indicating the particular event programmed to occur at that time. Releasing time set button 21 and then pressing button 21 again advances the clock to the next programmed event. During this review, if the user discovers an error (for example, an OFF has been programmed when the user intended to program an ON), the event can be changed by simply pressing the command button 22 to change the status indicator on the display. If eight events have been programmed, any programmed status can be changed at a given time but to change the time at which an event takes place the program will have to be cleared and programming will have to begin again. The programmable wall switch will automatically reset LCD display 105 to the correct time and begin automatic operation thirty seconds after the review is complete.

To clear the program, the automatic/manual/off switch 101 is placed in the OFF (lower) position for one second; the display will then read "PF" when returned to the manual position to reset the correct time. The user will then have to reset the correct time into the unit because shutting the unit off deprives the clock and related circuitry of power.

Significant advantages are obtained through the use of only two buttons to carry out all programming and time setting functions. These advantages include a simplicity of operation which is a major advantage of the programmable wall switch and low cost through reduction of the number of switches compared to prior art systems.

The software utilized for programming the microprocessor 103 in conjunction with this invention is listed in Appendix A. The flow charts associated with the logic of the software are shown in FIGS. 4a through 4d. These materials are self-explanatory and thus will not be further described here.

SOFTWARE PROGRAM

Figure 4:
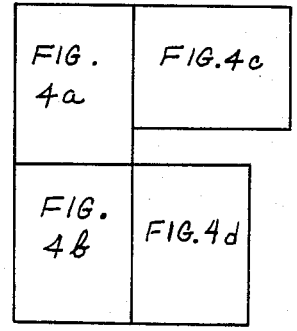
FIG. 4 shows the relationship of FIGS. 4a, 4b, 4c and 4d.
Figure 4A:
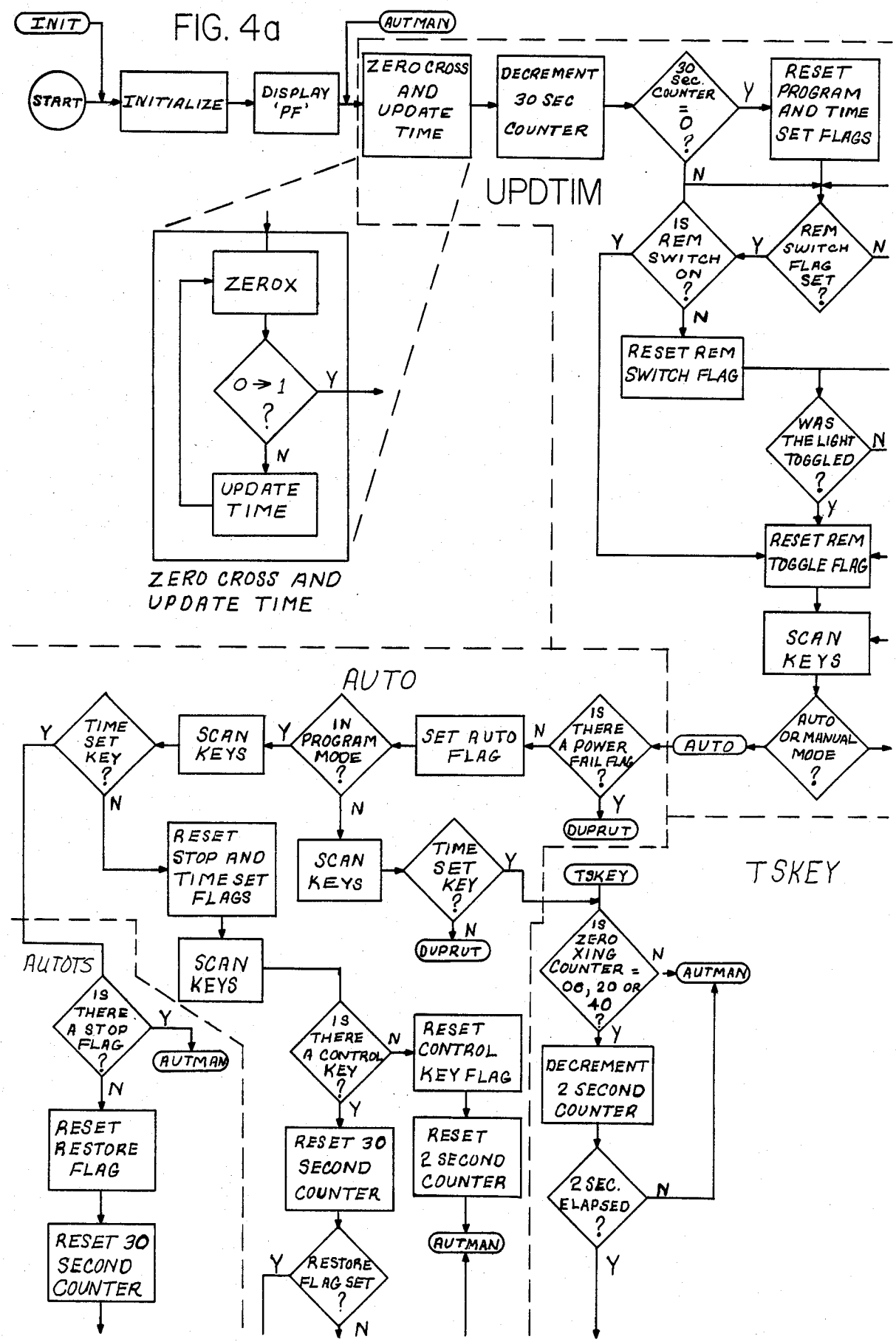

FIG. 4a illustrates the initial portion of the software program used with this invention. At the start of the program, the system is initialized. At this step, which is associated with the TMS-1000 microprocessor used with the preferred embodiment this invention, the RAM memories within the TMS-1000 are cleared, timers are reset to initial values and selected RAMS have set in certain BCD to LCS display conversion codes.

The system next transmits to the display the bit pattern that loads "PF" (denoting power failure) into the display. Next the "Autman" part of the program is implemented. First a "zero crossing" and "update time" routine is implemented. The zero crossing routine determines from the zero crossing input waveform on lead K8 to microprocessor 103 (FIG. 1a) whether or not the zero crossing signal is going from a low to a high level or from a high to a low level. If the waveform is going from a low to a high level, the system then determines whether or not at that time the light should be on or off and, if it should be on, produces an output pulse from microprocessor 103 on output lead 00 to triac TR1 (FIG. 1a). If the light should be off, the triac is not fired and the routine exits the zero crossing portion of the program. If the transition however from the zero crossing is from high to low, then the software determines whether or not the light should be on fully or dimly and if on full fires the triac. If on dimly, the program exits the routine again. If the light is to be on full, then the triac is again fired by microprocessor 103 putting an output signal on lead 00 to triac TR1 to trigger it during the second half cycle. In the zero crossing and update time block (illustrated in detail in FIG. 4a) the exit from the zero crossing routine is followed by a test labeled 0 to 1 to determine if the signal on input lead K8 (FIG. 1a) has gone from a zero to a one. If it has not, then the microprocessor updates time and returns to the zero crossing routine. The update time routine increments a seconds counter in microprocessor 103 (FIG. 1a) initially set at 59 which keeps track of the number of high to low level crossings of the signal on input lead K8 and which is decremented by the update time signal. After 60 of these signals, one second has passed. The microprocessor includes, in addition to the seconds counter, a minutes counter initially set at zero which is incremented up to 9, a 10-minute counter which is incremented up to 5, and an hour's counter which is incremented from zero to 12. Thus, the microprocessor is capable of keeping track of time in 12-hour increments. In addition, an AM/PM flag is provided to allow the system to keep track of a whole day. The updating of time is carried out by the UPDTIM routine (FIGS. 4a and 4c) in the software. Following the update time routine, the program goes on to the next logic block which is "decrement 30-second counter." The 30-second counter comprises the number 59 initially stored in the RAM. This number is decremented every half second if neither the command key 22 nor time set key 21 (FIG. 1b) is pressed by the user within that time. If the time set or command key is pressed within this time (as determined by microprocessor 103 sensing a low level signal on input R1 or R3), this counter is reset to 59. If the number in the counter equals zero, the counter is left at zero and the program automatically sends the system to operate in whatever mode has been set by the placement of switch 101 (FIG. 1a). Typically this mode will be the automatic mode although it might be the manual mode.

In the automatic mode, the system is then set to automatically turn lights on and off or dim the lights in accordance with pre-arranged instructions in the program. In the UPDTIM routine, the remote switch (shown as "three-way sense" in FIG. 1b) provides either a square wave if power is available on this line or no signal if power is not available. The microprocessor 103 (FIG. 1a) detects the presence or absence of power on the three-way sense line at input lead K4 and uses this information to test whether or not remote switch is on. If it is on, microprocessor 103 resets a remote toggle flag. If the remote switch is not on, it resets the remote switch flag and then asks whether or not the light was toggled. If the light was toggled, then the remote toggle flag is reset and the system proceeds into the scan key mode of operation. If the light was not toggled, then the system toggles the light and again proceeds to the scan key operation. If the remote switch flag had not been set, then the system automatically asks whether the remote switch is on. If it is, then it sets the remote switch flag and then asks was the light toggled. If it was not, it toggles the light and then goes to the scan key operation. If it was, it resets the remote switch toggle flag and again returns to scan key operation. The microprocessor passes through this routine once each cycle of the AC line voltage.

Before the rest of the program is described, it should be noted that typically the TMS 1000 requires twelve microseconds to execute an instruction. The zero crossing signals provided to the microprocessor occur approximately every half cycle of the 60-cycle line current or about every 7 or 8 milliseconds. The microprocessor 103 can execute up to about 700 instructions in seven milliseconds. The clock driving the microprocessor 103 runs at approximately 500 kilohertz. Six clock periods, each of 2 microseconds, are required to execute one instruction.

Returning now to the software program, the system's scan key instruction results in the microprocessor 103 scanning the input terminals D, E and G connected to the command key 22 or the time set key 21, respectively (FIG. 1b) to determine whether or not either of these two keys have been depressed. Microprocessor 103 also scans the setting of switch 101 to determine its status. These inputs are sent to the computer on leads K1 and K2. This scanning determines whether or not switch 101 has been set in the automatic or the manual mode. If the system has been set in the automatic mode, a flag has been set during the initialization routine that stated whether or not there had been a power failure. If there had been a power failure, then the system exits from the software and goes to subroutine DUPRUT. The DUPRUT routine (shown in FIG. 4c) asks whether a control key 21, 22 had been pushed and if one has been pressed, then the software executes the NEWTGL routine (shown in FIG. 4d). The NEWTGL routine asks first whether the control key flag is set. If the answer is yes, this means that the last time through this routine, the command button was also pressed. The program then decrements the 2-second counter and then asks whether or not 2 seconds have elapsed. If 2 seconds have elapsed, then the light is dimmed or the program status is set to dim, depending upon the mode of operation of the system. If the control key flag was not set, then the control key flag is set as would happen the first time the NEWTGL routine is used. The light will then be toggled on or off (i.e., the light state will be changed) and the program will then ask if it is in the program mode. If it is not, it will decrement the 2-second counter and then ask if 2 seconds have elapsed. If 2 seconds have not elapsed, it returns to the appropriate position on the DUPRUT subroutine. If 2 seconds have elapsed, then it sets the light status to "dim" and returns to the DUPRUT routine (FIG. 4c). If the system is in the program mode, it sets the toggle flag. The toggle flag reflects the fact that the command button has been pushed. The system then decrements the 2-second counter and asks whether or not 2 seconds have elapsed. If 2 seconds have elapsed, again it sets the real operation or the program status of the light to "dim" and then returns to the appropriate point in the DUPRUT routine. If 2 seconds have not elapsed, it returns to this same point.

Returning to the DUPRUT subroutine, the system then goes to the AUTMAN routine and begins operation again as described above.

Returning now to the auto routine, if a power failure flag is not showing, then the system sets the automatic mode flag and asks if the system is operating in the program mode. If the time set switch has been pushed the system determines that it is operating in the program mode. If the time set switch has not been set, it determines that it is not in the program mode and goes to the scan keys operation. The scan keys routine involves turning on either R1 or R2 in TMS 1000 microprocessor 103 and then looking at K1 or K2 to determine the voltage on the appropriate input lead. This routine is known as the "R2 keys" routine and the "R1 keys" routine shown in the software listing.

Following the scan keys routine, the program asks whether the time set key is pressed. If the answer is no, it returns to the DUPRUT subroutine as described above. If the answer is yes, it goes to the TSKEY routine. The TSKEY routine then asks whether the zero crossing counter is at 00, 20 or 40. Since the zero crossing counter increments once each cycle of the 60-cycle line current, and since it decrements the 2-second counter on a count of 00 or 20 or 40 in the zero crossing counter, in essence the 2-second counter is decremented six times approximately over 2 seconds thereby giving a finer degree of control on the 2-second counter than would otherwise be possible if decremented only once each second.

Following the decrementing of the 2-second counter, the program tests to see if the 2 seconds have elapsed. If they have not, it returns to the AUTMAN program as described. If they have, it then resets the 2-second counter and sets the real time to 11:59 A.M. or the set time if the system is operating in the program mode to 11:30 A.M. It also resets the 30-second and the 5-second counters and sets the "time set flag". Finally, it asks whether the system is operating in the automatic or manual mode and, if it is in the automatic mode, goes to the set program flag and then returns to the SHOZRO subroutine. If it is in the manual mode, it resets the power fail flag to zero and likewise returns to the SHOZRO operating mode.

The SHOZRO mode (FIG. 4c) is a relatively simple mode which involves the executing of the zero crossing routine to test for the "zero to one" transition on the zero crossing waveform and to ask whether or not this transition occurs. If it does occur, then the system displays the time on LCD 105 and goes to AUTMAN (see FIG. 4a). If it does not occur, the program asks if the control key 22 (FIG. 1b) is pressed. If key 22 is not pressed, the program updates the time and returns to the execute zero crossing routine. If the control key 22 is pressed, the software again returns to the zero crossing routine (see FIG. 4a). This particular routine ensures that time is updated. This particular routine prevents the system from being in a state such that when the command key 22 (FIG. 1b) is pressed, the zero crossing counter is never able to test for 00, 20 or 40 (see TSKEY and SHOZRO routines, FIGS. 4a and 4c, respectively), for the purpose of decrementing the 2-second counter. Unless the zero crossing counter is able to test for the occurrence of these times, the system will never "dim" after the command button has been pressed for approximately 2 seconds. This routine ensures that the system will "dim" when the command button has been pressed for about 2 seconds. Following the SHOZRO routine, the system returns to the AUTMAN routine described above.

If the test for whether or not the system is in the program mode (part of the AUTO routine shown in FIGS. 4a and 4b) is answered yes, then the system again scans keys to determine whether or not the time set key 21 has been pushed. If it has not been pushed, then the system resets the stop and time set flags, again scans the keys 21, 22 to determine if the control or command key 22 (FIG. 1b) has been pushed. If they have not been pushed, the system resets the control key flag, resets the 2-second counter and enters the AUTMAN routine as described above. If the control key 22 has been pushed, then the 30-second counter is reset and the system asks if the COMPAR routine (FIG. 4d) has indicated that this time is a previously-set time by checking the status of the "restore flag set". If so, the restore flag will have been set and the software will immediately go to NEWTGL and thereby change the programmed status of the light at that time. The program saves the set time and then goes to the SHOZRO routine already described. If a restore flag has not been previously set during the COMPAR routine (see FIG. 4d), then the system asks if the program memory is full. If it is not, it again calls for a new status for the switch at that time. If the answer is yes, the system displays an error signal EEE on the display and returns to AUTMAN. If the program memory is not full, it then sets a new status for the system at that time and saves the time as well as the status.

Returning now to the automatic mode query as to whether the time set key 21 (FIG. 1b) has been pressed, if the answer is yes, the software then enters the AUTOTS routine and asks if there is a stop flag at this point. If the answer is yes, it returns to the AUTMAN routine. If there is a stop flag, the user generally will not want to continue to increment the time or will want to stop at that time to give the user a chance either to maintain the status or change the status of the light at that time. If there is not a stop flag at that time, then the system resets the "restore flag" so that if formerly this had been a previously-set time it no longer is and then resets the 30-second counter. The system then asks if there is a toggle flag. If the answer is no, the system immediately asks "Is there a time set key flag". If the answer is no, it sets the hold off flag. The hold off flag prevents the system from incrementing each time through the loop. If the answer is yes (i.e., a time set flag has been set) then the program asks whether the zero crossing counter is zero or 30. If the answer is yes, it again asks if the hold off flag is set and if the answer is no, it adds 30 minutes to the set time and then sets the time set key flag and enters the COMPAR routine. If the time set key flag inquiry has been answered no and the set hold off flag had been implemented, the system goes directly to the "add 30 minutes to set time" and from there goes to the "set time set key flag" and the COMPAR routines. If the zero crossing counter was not 00 or 30, the system goes to the AUTMAN routine (FIG. 4a). If the hold off flag set had been answered yes, then the system resets the hold off flag and again goes to the AUTMAN routine (FIG. 4a).

If the query "is time set memory full" (AUTOTS routine, FIG. 4b) had been answered "no", the system increments the set time pointer and then returns to the question "is there a time set key flag?" and follows the routine as described above.

The COMPAR routine (FIG. 4d) operates in response to the AUTOTS routine reaching the point in the program just described. The COMPAR routine first sets a compare pointer to zero. The zero crossing and update time routine stops the software routine in anticipation of a zero crossing signal and then updates the real time stored within the microprocessor before continuing the routine. Following the update of time, the software compares the real time AM/PM with the set time AM/PM. If the times are not the same, it increments the compare pointer by two and goes to the next location. "Pointer>15" merely means that there are 8 stored times, each of which takes 2 nibbles, so ">15" at this test means that the system has a full capacity of set times. If pointer is not ">zero", one returns to the COMPAR routine again. If the times are the same (it should be noted that times are matched only to the half hour) the system then compares hours. If the hours are not the same, it then exits over to the "increment COMPAR pointer by 2" routine. If the hours are the same, the program compares the half-hour. Again if they are not the same, the program exits to the "increment COMPAR pointer by 2" routine. If they are the same, it asks if the system is in the program mode. If the system is not in the program mode, then the system knows that it is to turn on, turn off, or dim a light at some time related to this time. The system then enters a routine entitled "save random time". This routine takes the count in a selected counter in the microprocessor and adds that count to the time to determine the time at which the operation on the light is to be carried out. The selected counter is such that the count in the counter every half hour will vary in somewhat of a random fashion. The counter has the capacity to hold a count from zero to nine but is driven by a signal that goes from zero to 12, thereby ensuring that the count in the counter every half hour will be somewhat different. If the system is not in the program mode, it then compares the random time in the register to the minutes to carry out the designated operation on the light at the set time plus this random time. If the random time equals the minutes, thus indicating that an operation should be carried out on the light, the system then asks is zero crossing counter at 59. If the zero crossing counter is not at 59, the answer is no and the system treats this as a "no match." This is designed to prevent the system from overriding immediately a user's command to alter the state of the light from that dictated by the system immediately after the system has set the light in that state. But for this test, such an overriding within one minute of the controlling of the state of the light by the system would be picked up by the system as occurring at the same time as the original operation on the state of the light and thus would override the user's control if the user entered a new command into the system within one minute of the system's operation. If the zero crossing counter is 59 it is deemed to be match and the next step is to the program mode. If the zero crossing counter is not in the program mode, then the real time light status is replaced with the saved time light status and the system then goes to the SHOZRO routine (FIG. 4c). If the system is in the program mode, then a stop flag is set and a restore flag is set and the set time light status is replaced with the status saved in a different register associated with that time. Thus, the status of the light associated with the time display is now being displayed. Now, if the user hits the command button, the status associated with that time will change and when the desired status has been achieved, will be stored in the same register with the time. The status of the light is changed as shown in the logic of FIGS. 4a and 4b for the "auto" mode in the "program mode" with the control key 22 pressed and the time set key 21 not pressed.

Returning now to the branching point (UPDTIM, FIG. 4a) where the program tested to determine whether the system was in the automatic or the manual mode, if the system determines that it is in the manual mode, it resets the programs and auto flags (i.e., the system is no longer in the automatic or the program modes). It then clears the time set light status. It then scans the keys. It then asks if the time set key 21 is pressed. If the answer is no, it resets the 5-second counter and resets the time set key flag, and enters the DUPRUT routine (FIG. 4c). The system then continues to scan the keys and asks if control key 22 is pressed. If the answer is no, it resets the control key flag, resets the 2-second counter and asks if a power failure flag has been set. If the answer is no, it asks if the system is in the automatic or manual mode and if in the manual mode, goes to the SHOZRO routine (FIG. 4c) and if in the AUTO mode goes to the COMPAR routine (FIG. 4d). Both of these routines have been described above.

If the control key 22 is pressed, the system then goes to NEWTGL (FIG. 4d) and sets the control key flag and then returns to the AUTMAN routine (FIG. 4a).

Figure 4B:
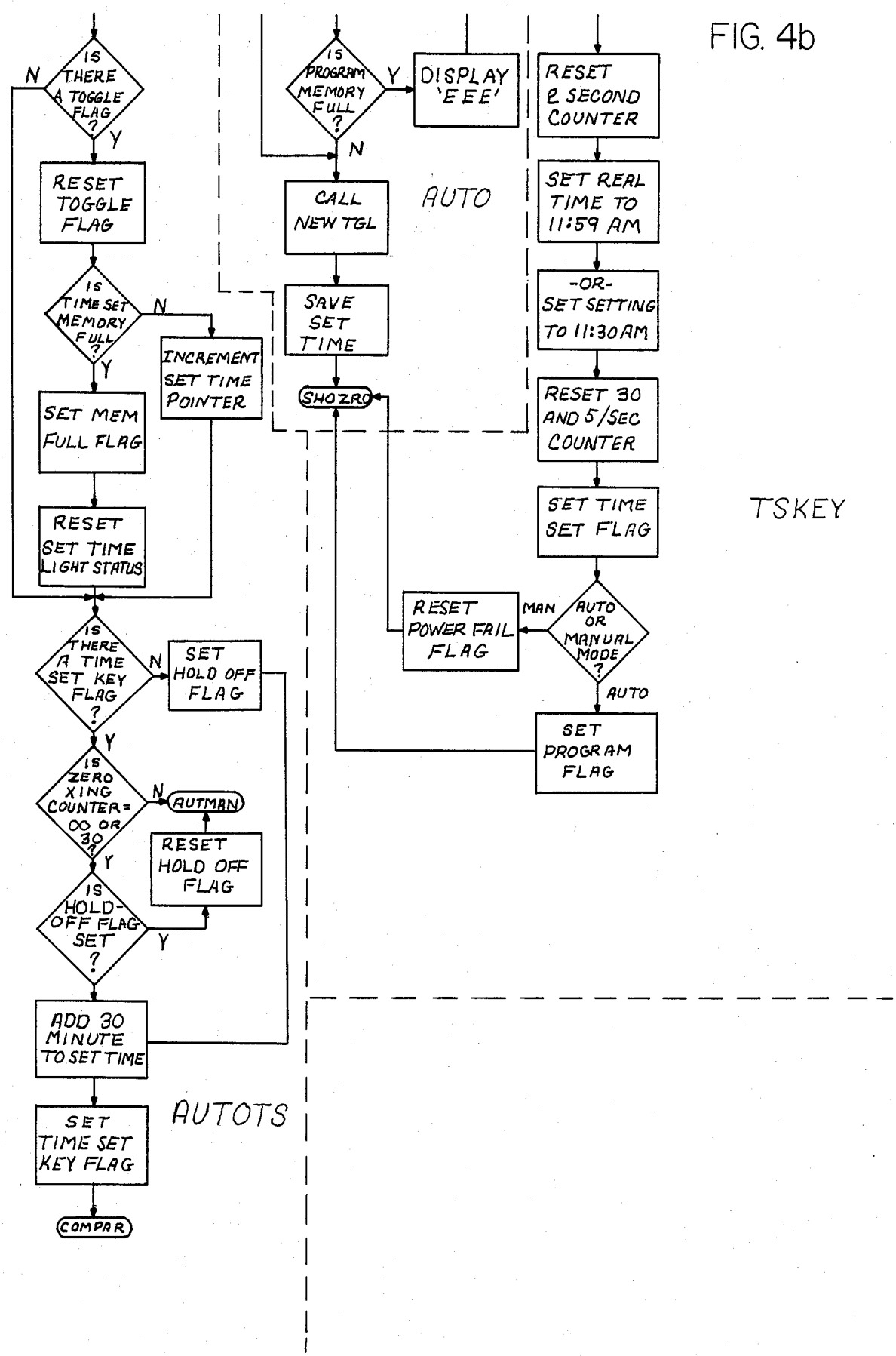
Figure 4D:
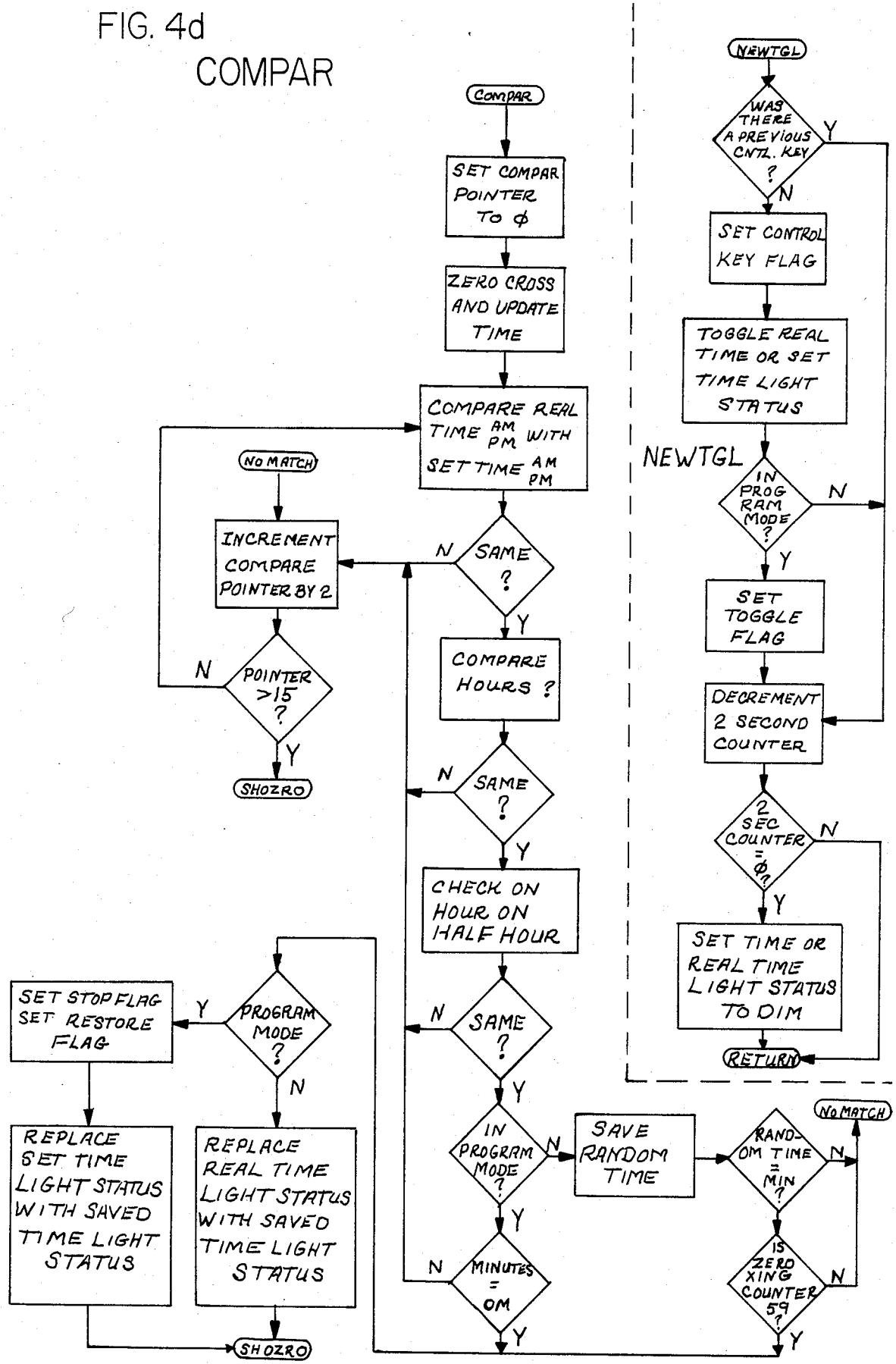

If the time set key 21 has been pressed (MANUAL routine, FIG. 4c) the program resets the 30-second counter and asks was a power failure serviced? If the answer is no, it goes to the TSKEY routine (FIG. 4b). If the answer is yes, the program then asks if 5 seconds have elapsed. In the MANUAL mode, the 5-second counter allows the system to increment real time at a slow speed (one minute intervals at a 1 Hertz rate) before 5 seconds have elapsed and then accelerate to a faster speed after 5 seconds. In the fast mode, the system increments real time at 10 minute intervals (at a 2 Hertz rate). If the answer is yes, the system resets the real time minutes to zero and then adds 10 minutes to real time. It then goes to the SHOZRO routine (FIG. 4c).

Returning now to the 5-second elapsed test, if the answer is no, it asks if the "time set key flag" is set? If the answer is no, it resets the zero crossing counter to 59 and then adds one minute to the real time and sets the time set flag and then goes to the SHOZRO routine. If the answer is yes (i.e. the time set key flag had been set), the system goes to the zero crossing counter and checks for "00" or "30". If the answer is yes, the counter is at either of these two numbers, the system then goes to the decrement 5-second counter which then adds one minute to real time and sets the time set key flag and goes into the SHOZRO routine. This routine increments one-minute intervals at a 2 Hertz rate every half second. After 5 minutes it increments every ⅓ second (i.e., zero crossing counter at 00, 20 and 40) and adds 10 minutes to real time at each incrementation.

The Appendix comprises a listing of the actual software used to implement the above.

One embodiment of this invention has been described. Other embodiments of this invention will be obvious to those skilled in the art. Thus, the above description is to be considered illustrative only and not limiting. In particular, while the programmable light switch is capable of storing up to eight events at eight different times, the number of event-time combinations capable of being stored can be changed by changing the size of the memory.

APPENDIX A

SECURITY SWITCH SPECIFICATION

Introduction

This specification documents the operation and device parameters of a microcomputer controlled light switch for PCI. The unit has a liquid crystal display for user interaction and serves as the output for a real time clock. The user can select between a manual mode (light switch only) and an automatic mode (with programmable on/off times). Two momentary switches will be available to turn the light on or off; or to program time and set points. The unit can also be turned off. When off, power is isolated from the unit.

Reference Documents

The following documents provide information, specifications, and data relating to the design of the switch.
TMS 1000 series data manual
HLCD 0438 specification—Serial input LCD driver
Owners manual Mechanical Description The switch consists of two parts, a control box and an I/O panel. The control box contains the power supply, auto/manual off switch, the power control circuit, and the microcomputer. The control box connects to the I/O panel through a standard faceplate via a six pin connector. The I/O panel contains a serial input LCD driver, a 3½ digit liquid crystal display, and two momentary switches.

Electrical Specification (see schematic)

Power Supply Requirements: The TMS 1000 requires a voltage "box" of 7.5 V to 10 V. The power supply design also provides a square wave output with rising and falling edges synchronized to the zero crossings to allow the computer to keep track of time and insure proper triac firing.

Inputs: The TMS 1000 has four input lines. The system uses one K line for an input from the auto/manual switch. One K line allows the computer to monitor the set and control switches selected by two R outputs. One K line monitors the zero crossing input information. The last K input is used to monitor the status of a remote switch in a three way system.

Outputs: The TMS 1000 outputs data to the Hughes LCD driver using three R outputs. One R output connects directly to the load input of the HLCD 0438 to latch the segment drive information. Two R outputs connect in parallel to the set and control switches and are used to output and clock serial data into the LCD driver chip. One R output is used to select the auto or manual switch for testing. And one R output line is used to drive a transistor to gate the triac. The triac is gated once every half cycle (full on) or once a cycle (half on). This provides an energy saving feature.

Device Operation

Special Features: The unit has a RANDOM mode feature where the lights will turn on/off or half at randomly varying deviations (up to 9 minutes) after the user programmed set points. This feature is used for home security and provides a more natural appearance for a vacant home. The user can select eight of 48 set points, each one half hour apart.

| EVENT | PROGRAM ACTIONS RESPONSE |
|---|---|
| Return of power | Display shows "PF" Load is turned on |
| Switch to MAN and press TIME SET | Display shows 12:00 PM after a 2 sec. delay and the "ON" annunciator is turned on |
| Press and hold TIME SET button | Time increments by minutes at a 1 Hz rate for 5 seconds |
| Hold TIME SET more than 5 seconds | Resets minutes to zero and increments tens of minutes at a 2 Hz rate. |
| Release TIME SET and press again | Time increments by minutes at a 1 Hz rate for 5 seconds. |
| Impulse pressing of TIME SET | Time increments by one minute |
| No key entry or mode change for 30 seconds | Time is entered and timekeeping begins Unit enters MANUAL mode |

-continued

| PROGRAM ACTIONS | |
|---|---|
| EVENT | RESPONSE |
| After time is set, switch to AUTO mode | Time is entered and timekeeping begins Unit enters AUTO mode |
| Press TIME SET (AUTO mode) and hold for 2 seconds | Display shows 12:00 PM, indicates PROGRAM mode, ON/OFF annunciator segment shows current status (ie on, half, off) |
| Press TIME SET (AUTO Mode) and hold (release at desired program time) | Display increments in 30 minute intervals at a 2 Hz rate. When the key is released the display shows the desired program time. |
| Press COMMAND switch | Toggle through the ON/OFF/HALF annunciators and saves time and status |
| Press TIME SET again | Advances the display in 30 minute intervals at a 2 Hz rate. |
| Holding TIME SET and a previosly set time is reached. | Display stops at programmed time The annuciators show the preset status |
| Press COMMAND (at set time) | Annunciators toggle from on to off and go to dim after 2 seconds also saves program time. |
| Press COMMAND (memory full, not on set time) | Display shows "EEE", returns to normal operation by pressing TIME SET again. |
| Toggle REMOTE switch (any mode) | Light changes state |
| No key entry or mode mode change for 30 seconds. | Unit leaves PROGRAM mode, returns to real time display AUTO mode. |

SECURITY SWITCH ROUTINES (1) INIT
    CLRSTM
    CLRSET
    SCOUN

This routine will load in the segment decode information, clear the set time registers, and preset the counter values.

(2) BEGPF
    PF

This routine will send segment information to the display RAM for the 'PF' display after power up.

(3) LOAD

This will toggle the load line that transfers the display information from the RAM into the LCD.

(4) AUTMAN

This is the start of the program. All loops will return to this spot. This part of the program will call routines to check the zero cross and to update the time.

(5) THSECK

Every ½ second this routine branches to DECTHR otherwise it goes to GTOCON.

(6) DECTHR
    STORE

This routine decrements the 30 second timer and if it does will reset the power fail acknowledged flag and the program flag.

(7) GTOCON
    CONTIN
    RSSET
    CHNG1
    CHNG2
    LITTGL
    CON+A

This routine checks the remote switch. If there is a change in the remote switch, then the light in turned on (or off). Also, this routine will make sure that the unit always powers up with the light on.

(8) CON+I

These instructions test the auto/manual switch and branch accordingly.

(9) MANUAL
    CHKCTL

This resets some flags, and checks the time set key.

(10) REST30
    PAGE2

The 30 second counter is reset, and a check is made of the "PFACK" flag.

(11) TSKEY
    DEC2KT
    DEC2CT
    DC2CT
    CALL12
    CALFIN
    PREDIS
    VIEW

These routines are all 'in line' code to check the time-set key and loop back around to the start while decrementing a two second counter. If the key remains pressed for longer than two seconds, then 12:00 PM is loaded into the display and memory.

(12) TWELVE
    TWELVM
    TWELVP
    RETTWL

These load 12:00 pm into the time registers.

(13) FIN12+

This finishes loading the time and resets the 30 and 5 second counters.

(14) CLRCHR
    LOOP3
    TOLOAD

These clear y number of characters from the display

(15) DUMPEE
    EEES
    FINEEE

Loads 'EEE' to the display

(16) AUTO
    GOCATO
    AAAMMM
    DOAUTO

In line code that starts the auto mode. It checks to see if the power fail has been serviced.

(17) AUTOTS
    CHKSTP
    PRGMTS
    CONT30
    HLDOFF
    CALLL
    GOAD30
    TSTHLD
    RSTHLD
    AD30+1

These routines service the time set key. It will check the stop flag (if present it will not increment the time,) the toggle flag (if present it will go to EXSPTM,) and it will increment the program time by 30 minutes every ½ second.

(18) R2KEYS
    R1KEYS
    SETOUT

Keyscan routines.

(19) SAVPTM
    ONZHR
    TOSHO

Save the program time in one of the set time locations.

(20) EXSPTM
    AD2TOM
    GO+30

Resets the toggle flag, increments the pointer to the next empty set time, and sets a flag if the memory overflows.

(21) SETUP
    TCYPTR
    CONSET

This will go to the location pointed to by either the new entry pointer or the review pointer.

(22) NUSTUP

This will go to the RAM pointed to by the review pointer.

(23) SETXST
    SHO3HZ
    DO2HZ
    CALL
    SHO1HZ
    AD1

These will increment the time (in the manual mode) by 1 minute increments at a 1 hz rate for 5 seconds, then at a 2 hz rate in 10 minute increments. p0 (24) NEWTGL
    CLMDCK
    TOGLLL
    FLGOFF
    OUTTGL
    SETBIT
    BEGDEC
    D2SEC
    TGLHLF
    SAVNSH
    RETURN
    TOSAVP These routines will toggle either the status of the lights or the status of the annunciators in the display. If the control key is pressed for more than 2 seconds, the the display or annunciators will go to dim.

(25) RSTFLS
    RSTAFL

Resets the program, auto, and reset flags

(26) SEND4B
    DIR4B
    SEND3B
    DIR3B
    LOOP
    OUTHI
    OUTDEC
    TOLOOP

These will send 4 bits or 3 bits to the display, either directly or indirectly.

(27) NOMCH
    AGGIN
    TOSHOT

This routine tells the unit what to do if there is no match in the compare routine.

(28) COMPAR
    CONCOM
    AGAIN
    PM
    NOMTCH
    SAME
    COMP10
    CHEKHF
    CHKRND
    PCOMP
    ACOMP

This is the compare routine that checks the set times with either the real time or the program time.

(29) MATCH
    ENDMCH
    STSTOP
    TOMTCH

This will either stop at the current display and replace the program time status with the set time status or it will replace the real time light status with the set time light status.

(30) PRGCTL
    RESTOR
    CHKFUL
    PRMEM
    TOOTGL

This tells what to do if there is a control key pressed in the program mode.

(31) SAVRND
    TSTHLF
    SAVE
    SAVXIT
    XITSAV

This will save the random time that is used in the compare routine.

(32) ZEROX
    KLOW
    KHI
    ZERONE
    ONEZER
    LTHLF
    FIRETC
    HOLDIT
    EXITZX

This is the routine that checks for the zero crossing and fires the triac, if necessary.

(33) AT3HZ
    TRYTWO
    AT2HZ
    TRYZER
    LEAVE
    OUTHZ

This will set a flag if the zero crossing counter is at the proper value.

(34) DUPRUT
    PFAIL?
    LIGHTS
    CONDUP

This routine describes what to do if the control key is pressed in any mode, except program.

(35) SHOTIM
    STRTSH
    ONRUT1
    ONRUT2
    RDIMFL
    NEXT
    CONSHO
    AMDIS1
    PMDIS1
    TENHR
    OUTZER
    OUTONE
    DIG2B
    SNDTEN
    COLON
    OFFCOL
    ONCOL

DIG3
DIMON
ANNUN
PRGON
TSTAP
AMDIS2
PMDIS2
FINSHO

These are all part of the routine to send the time to the display.

(36) MODCHK
OUT

This will go to either the program status location or the real status location.

(37) CLCTEN
TRYOUT
GETOUT

This will determine whether there will be a 10's digit.

(38) SEND1
SEND0
CLKOUT

This will load either a zero or a one into the display.

(39) UPDTIM
DECMSN
TEST30
COLTST
COLOFF
DECSEC
SAVRAN
MIN+10
MIN+01
MN1001
CHKAM1
RESET0
SAVR1
DONE1

This routine will update the time every 1/60 th of a second.

```
           TITLE  PCI    TMS1000
*
***********************************************************
*       TITLE:  LITESWCH  REV  4.2
*       DATE:   APR. 21, 1982
***********************************************************
***********************************************************
*                       RAM MAP
***********************************************************
****************** X FILE 0 *******************************
*Y=0   NOT USED
*Y=1   ZERO CROSS BUFFER, KEY SCAN BUFFER, AND OUTPUT LOOP COUNTER
*Y=2   ZERO CROSS BUFFER, KEY SCAN BUFFER, AND OUTPUT BUFFER
*Y=3   NOT USED
*Y=4   NOT USED
*Y=5   30 SECOND TIMER
*Y=6   30 SECOND TIMER
*Y=7   5 SECOND TIMER
*Y=8   2 SECOND TIMER
*Y=9   COMPARE ROUTINE SET TIME POINTER
*Y=10  LOAD SET TIME POINTER
*Y=11  RANDOM COUNTER
*Y=12  RANDOM BUFFER
*Y=13  NOT USED
*Y=14  NOT USED
***********************************************************
****************** X FILE 1 *******************************
*Y=0,2,4,6,8,10,12,14  SET TIME LIGHT STATUS AND FLAGS
*
*       B0      1/2 HOUR FLAG---1: SET TIME ON HALF HOUR
*                               0: SET TIME ON THE HOUR
*       B1      AM/PM FLAG------1: SET TIME IS PM
*                               0: SET TIME IS AM
*       B2      HALF/FULL FLAG--1: LIGHT SET TO COME ON FULL
*                               0: LIGHT SET TO COME ON HALF
*       B3      ON/OFF FLAG-----1: AT SET TIME LIGHT GOES ON
*                               0: AT SET TIME LIGHT GOES OFF
*
*Y=1,3,5,7,9,11,13,15   SET TIME HOURS
***********************************************************
****************** X FILE 2 *******************************
*Y=0,1,2,3,4,5,6,7,8,9
*       B0=     DIGIT Y, SEGMENT E
*       B1=              SEGMENT D
*       B2=              SEGMENT C
*Y=10   TIME SET CLOCK--MINUTES
*Y=11   TIME SET CLOCK--10'S OF MINUTES
*Y=12   TIME SET CLOCK--HOURS (1 TO 12)
*Y=14   SECOND COUNTER LSN
*Y=15   SECOND COUNTER MSN
***********************************************************
****************** X FILE 3 *******************************
```

```
*Y=0,1,2,3,4,5,6,7,8,9
*       B0=     DIGIT Y, SEGMENT G
*       B1=              SEGMENT B
*       B2=              SEGMENT A
*       B3=              SEGMENT F
*Y=10   REAL TIME CLOCK--MINUTES
*Y=11   REAL TIME CLOCK--10'S OF MINUTES
*Y=12   REAL TIME CLOCK--HOURS (1 TO 12)
*Y=14   CYCLE COUNTER LSN
*Y=15   CYCLE COUNTER MSN
*****************************************************************
*****************************************************************
*                       FLAGS
*****************************************************************
*                       X       Y       FUNCTION
*****************************************************************
        RSTRFL  EQU     0    *  0       14      RESTORE FLAG-UPDATE OR NEW SET TIME
        DIMANN  EQU     0    *  0       15      DIM ANNUNCIATOR
        REMSWS  EQU     1    *  0       15      REMOTE SWITCH STATUS
        STOPFL  EQU     2    *  0       15      STOP FLAG--PROGRAM MODE
        CNTKEY  EQU     3    *  0       15      CONTROL KEY FLAG
        PFACK   EQU     0    *  2       0       POWER FAIL ACKNOWLEDGED--MANUAL MODE
        AUTOFL  EQU     0    *  2       1       AUTO MODE FLAG
        REMTOG  EQU     0    *  2       2       REMOTE SWITCH TOGGLE FLAG
        CNTTGL  EQU     0    *  2       3       CONTROL KEY TOGGLE FLAG
        MEMFUL  EQU     0    *  2       4       PROGRAM MEMORY FULL FLAG
        HOLDOF  EQU     0    *  2       5       HOLDOFF FLAG--INCR'MENTS ON KEY PRES
        CYCLE   EQU     0    *  2       6       CYCLE FLAG--1,1/2,1/3 SECOND ELAPSED
        TIMST   EQU     0    *  2       7       TIME SET KEY FLAG
        PFLAG   EQU     0    *  2       8       POWER FAIL FLAG
        COLFL   EQU     0    *  2       9       COLON FLAG
        PRGMFL  EQU     0    *  2       13      PROGRAM MODE FLAG
        AMPMFL  EQU     1    *  2       13      CLOCK AM/PM
        HFFLFL  EQU     2    *  2       13      LIGHT STATUS HALF/FULL
        ONOFFL  EQU     3    *  2       13      LIGHT STATUS ON/OFF
*****************************************************************
*****************************************************************
*                       INPUTS
*K1     CONNECTS TO CONTROL AND TIME SET KEYS
*K2     CONNECTS TO AUTO/MANUAL SWITCH
*K4     CONNECTS TO THE REMOTE SWITCH SENSE CIRCUIT
*K8     CONNECTS TO THE ZERO CROSSING CIRCUIT
*
*                       OUTPUTS
*R3     CONNECTS TO THE DISPLAY LOAD LINE
*R2     CONNECTS TO THE DISPLAY DATA IN LINE AND THE TIME SET KEY
*R1     CONNECTS TO THE DISPLAY CLOCK LINE, THE CONTROL SWITCH,
*                       AND THE AUTO/MANUAL SWITCH
*O0,O1  CONNECTS TO THE TRIAC DRIVE CIRCUITRY
*****************************************************************
*****************************************************************
0  0   0 1E  PF      CALLL   DIR4B   *COMPLETE POWER FAIL DISPLAY
0  0   0 CF
0  0   2 42          TCY     4
0  0   3 23          TYA
0  0   4 1E          CALLL   DIR4B
0  0   4 CF
0  0   6 49          TCY     9
0  0   7 C8          CALL    CLRCHR
0  0   8 4C  LOAD    TCY     3       *TRANSFER DATA TO LCD
0  0   9 0D          SETR
0  0  10 0C          RSTR
0  0  11 0F          RETN
*
0  0  12 15  AUTMAN  CALLL   ZEROX   *PROGRAM START
0  0  12 C0
0  0  14 3B          TBIT1   3
0  0  15 BA          BR      THSECK
0  0  16 17          CALLL   UPDTIM
0  0  16 C0
0  0  18 9E          BR      AUTMAN
```

```
0 0 19 13  THSECK  CALLL  AT2HZ
0 0 19 DE
0 0 21 38          TBIT1  CYCLE
0 0 22 98          BR     DECTHR *1/2 SEC ELAPSED?
0 0 23 B4          BR     GTOCON *NO, CONTINUE
0 0 24 34  DECTHR  RBIT   CYCLE  *(X= 2, Y= 6)
0 0 25 3C          LDX    0
0 0 26 4A          TCY    5      *YES, DECREMENT 30 SECOND TIMER
0 0 27 2A          DMAN
0 0 28 9A          BR     STORE
0 0 29 69          TCMIY  9
0 0 30 2A          DMAN
0 0 31 9A          BR     STORE  *<30 SEC!
0 0 32 2C          DYN           *TIME OUT
0 0 33 60          TCMIY  0
0 0 34 60          TCMIY  0      *SET 30 SEC. TIMER= 0
0 0 35 3D          LDX    2
0 0 36 40          TCY    0
0 0 37 34          RBIT   PFACK  *RESET POWER FAIL ACKNOWLEDGED FLAG
0 0 38 4B          TCY    13
0 0 39 34          RBIT   PRGMFL *RESET PRGM FLAG
0 0 40 B4          BR     GTOCON
0 0 41 03  STORE   TAM
0 0 42 3C  GTOCON  LDX    0
0 0 43 4F          TCY    15
0 0 44 18          BL     CONTIN
0 0 44 80
           *
0 0 46 23  CLRCHR  TYA           *CLEAR Y # OF VALUES FROM DISPLAY
0 0 47 44          TCY    2
0 0 48 0C          RSTR          *RESET R2
0 0 49 48          TCY    1
0 0 50 0D  LOOP3   SETR
0 0 51 0C          RSTR
0 0 52 07          DAN
0 0 53 89          BR     LOOP3
  0 54 0F          RETN
           *
0 0 55 4C  TOLOAD  TCY    3
0 0 56 C8          CALL   CLRCHR
0 0 57 BD          BR     LOAD
           *
0 0 58 23  FINEEE  TYA
0 0 59 1E          CALLL  DIR4B
0 0 59 CF
0 0 61 4A          TCY    5
0 0 62 C8          CALL   CLRCHR
0 0 63 BD          BR     LOAD
           *
           *
           *
           *AT CONTIN BEGINS A ROUTINE TO CHECK THE REMOTE SWITCH.
           *IF THERE IS A CHANGE IN THE REMOTE SWITCH, THEN THE
           *LIGHT STATUS IS TOGGLED. IN ADDITION TO THIS FUNCTION
           *IS A PROCEEDURE TO TURN THE LIGHT ON REGARDLESS OF THE
           *INITIAL STATUS OF THE REMOTE SWITCH ON POWER UP. THIS
           *IS DONE THROUGH THE USE OF TWO FLAGS, THE REMOTE SWITCH
           *FLAG AND THE REMOTE TOGGLE FLAG. THE REMOTE TOGGLE FLAG
           *IS SET IN THE INITIALIZATION ROUTINE AS PART OF THE
           *POWER UP/LIGHT ON SEQUENCE AND IS USED ONLY IN THIS
           *ROUTINE.
           *
0 1  0 3A  CONTIN  TBIT1  REMSWS *REMOTE SWITCH FLAG SET?
0 1  1 BD          BR     RSSET
0 1  2 08          TKA
0 1  3 44          TCY    2
0 1  4 03          TAM
0 1  5 39          TBIT1  2      *REMSWS NOT SET,IS THE REMOTE SWITCH ON?
0 1  6 B9          BR     CHNG1  *YES, CHANGE LIGHT STATUS/SET REMSWS
0 1  7 85          BR     CON+A  *NO, CONTINUE
0 1  8 08  RSSET   TKA
0 1  9 44          TCY    2
```

```
0 1 10 03          TAM
0 1 11 39          TBIT1   2       *REMSWS IS SET. IS THE REMOTE SWITCH ON?
0 1 12 85          BR      CON+A   *YES, CONTINUE
0 1 13 8E          BR      CHNG2   *NO, CHANGE LIGHT STATUS/RESET REMSWS
0 1 14 4F  CHNG1   TCY     15
0 1 15 32          SBIT    REMSWS
0 1 16 BA          BR      LITTGL
0 1 17 4F  CHNG2   TCY     15
  1 18 36          RBIT    REMSWS
0 1 19 3D  LITTGL  LDX     2
0 1 20 44          TCY     2
0 1 21 38          TBIT1   REMTOG  *IS REMOTE TOGGLE FLAG SET?
0 1 22 85          BR      CON+A   *YES--DON'T CHANGE LIGHT STATUS
0 1 23 3F          LDX     3
0 1 24 4B          TCY     13
0 1 25 16          CALLL   TOGLLL  *NO---TOGGLE LIGHT STATUS
0 1 25 FE
0 1 27 AE          BR      CON+I
0 1 28 3D  CON+A   LDX     2
0 1 29 44          TCY     2
0 1 30 34          RBIT    REMTOG  *RESET REMOTE TOGGLE FLAG
0 1 31 1C  CON+I   CALLL   R1KEYS
0 1 31 CC
0 1 33 3A          TBIT1   1       *AUTO MODE?
0 1 34 8A          BR      AUTO    *YES GO TO AUTO MODE
0 1 35 16  MANUAL  CALLL   RSTFLS
0 1 35 E4
0 1 37 1C          CALLL   R2KEYS
0 1 37 C9
0 1 39 38          TBIT1   0       *TIME SET?
0 1 40 A2          BR      REST30  *YES; GO TIME SET ROUTINE
0 1 41 4E          TCY     7       *(X=0)
0 1 42 65          TCMIY   10
  1 43 3D          LDX     2       ***************
  1 44 4E          TCY     7       *RESET TIME SET KEY FLAG
0 1 45 34          RBIT    TIMST   ***************
0 1 46 13  CHKCTL  BL      DUPRUT
0 1 46 8B
0 1 48 4A  REST30  TCY     5       *RESET 30 SECOND COUNTER
0 1 49 69          TCMIY   9
0 1 50 6A          TCMIY   5
0 1 51 3D          LDX     2
0 1 52 4C          TCY     3
0 1 53 0F          RETN
0 1 54 40          TCY     0
0 1 55 14          BL      PAGE2
  1 55 80
                   *
0 1 57 12  AUTO    BL      GOCATO
0 1 57 A9
                   *
                   *
0 1 59 1B  TOMTCH  CALLL   MODCHK
0 1 59 CA
0 1 61 11          BL      MATCH
0 1 61 80
                   *
                   *
                   *
0 2  0 38  PAGE2   TBIT1   PFACK   *PREVIOUS TIME SET FLAG?
0 2  1 BB          BR      SETXST  *YES--TIME SET KEY ALREADY PRESSED
                   *
  2  2 13  TSKEY   CALLL   AT3HZ   *NO--INITIAL TIME SET KEY PRESSED
0 2  2 C0
0 2  4 38          TBIT1   CYCLE
0 2  5 BE          BR      DEC2KT  *1/3 SEC ELAPSED?
0 2  6 90          BR      GOBACK  *NO--GO TO START
                   *
0 2  7 1E  DEC2KT  BL      DEC2CT  *YES--DECREMENT 2 SEC COUNTER
0 2  7 AA
                   *
```

```
            *THE PROGRAM WILL LOOP FROM START TO HERE TO START UNTIL
            *TWO SECONDS HAVE ELAPSED. THE RESULT IS THAT NOTHING
            *HAPPENS FOR THE FIRST TWO SECONDS AFTER THE TIME SET
            *KEY IS PRESSED. AFTER TWO SECONDS, THE DEC2CT ROUTINE
            *WILL SET THE TIME TO 12:00, ACKNOWLEDGE THAT THE POWER
            *FAIL HAS BEEN SERVICED BY SETTING THE PFACK FLAG
            *AND WILL RETURN TO START. THIS RETURN
            *TO START WILL VARY DEPENDING ON WHETHER IN AUTO OR MAN,
            *BUT, IF THE TIME SET KEY REMAINS PRESSED WHILE IN THE
            *MANUAL MODE, THE PROGRAM WILL SEE THIS PFACK FLAG SET
            *(SEE LABEL "PAGE2") AND WILL JUMP TO SETXST.
            *IN THE AUTO MODE IT WILL GO THROUGH THIS ROUTINE
            *UNTIL THE TWO SECONDS HAVE ELAPSED, THEN IT WILL GO
            *INTO THE PROGRAM MODE AND WILL GO ON TO INCREMENT
            *THE PROGRAM TIME.
            *
  2  9 3C SETXST LDX     0
  2 10 4E        TCY     7
  2 11 26        MNEZ            *5 SEC UP?
  2 12 8D        BR      DO2HZ   *NO--INCREMENT COUNTER AT 2 HZ RATE
  2 13 13        CALLL   AT3HZ
  2 13 C0
  2 15 38        TBIT1   CYCLE
  2 16 9D        BR      SHO3HZ  *YES--INCREMENT COUNTER AT 3 HZ RATE
  2 17 90        BR      GOBACK
            *
  2 18 34 SHO3HZ RBIT    CYCLE   *5 SECONDS IS UP, SO INCREMENT
  2 19 3F        LDX     3       *AT A 3HZ RATE AND
  2 20 45        TCY     10
  2 21 60        TCMIY   0
  2 22 17        CALLL   MIN+10  *ADD 10 MIN TO BUF TIME
  2 22 C6
            *
  2 24 15 SHOZRO CALLL   ZEROX   *CHECK ZERO CROSS AND DO A DISPLAY
  2 24 C0
  2 26 3B        TBIT1   3       *ROUTINE. IF THE CONTROL KEY IS
  2 27 A3        BR      TODISP  *PRESSED, DO NOT UPDATE THE TIME.
  2 28 3C        LDX     0       *(WHEN THE CONTROL KEY IS PRESSED
  2 29 4F        TCY     15      *A TWO SECOND TIMER IS DECREMENTED
  2 30 3B        TBIT1   CNTKEY  *IN THE TOGGLE ROUTINE, BUT THE TIME
  2 31 98        BR      SHOZRO  *WAS BEING UPDATED TWICE BETWEEN
  2 32 17        CALLL   UPDTIM  *EXECUTIONS OF THE TOGGLE ROUTINE
  2 32 C0
  2 34 98        BR      SHOZRO  *RESULTING IN THE COUNTER NOT BEING
  2 35 1B TODISP BL      SHOTIM  *DECREMENTED.)
  2 35 80
            *
  2 37 3D DO2HZ  LDX     2       ********************
            *       (Y=7)        *TEST TIME SET KEY FLAG
  2 38 38        TBIT1   TIMST   *IF SET GO ADD 1 MINUTE
  2 39 A4        BR      CALL    ********************
  2 40 3F        LDX     3       *IF NOT, THEN
  2 41 47        TCY     14      *RESET ZERO CROSSING COUNTER TO 59--
  2 42 69        TCMIY   9       *WAITS 1/2 SEC TO ADD 1 NEXT TIME
  2 43 6A        TCMIY   5       ********************
  2 44 A5        BR      AD1     *GO ADD ONE ONE MINUTE
  2 45 13 CALL   CALLL   AT2HZ
  2 45 DE
  2 47 38        TBIT1   CYCLE   *1/2 SECOND ELAPSED?
  2 48 89        BR      SHO1HZ  *YES--INCREMENT TIME BY 1
  2 49 90        BR      GOBACK  *NO--GO TO START
  2 50 34 SHO1HZ RBIT    CYCLE
  2 51 4E        TCY     7
  2 52 3C        LDX     0
  2 53 2A        DMAN            *DECREMENT 5 SECOND COUNTER
  2 54 03        TAM
  2 55 3F        LDX     3
  2 56 17 AD1    CALLL   MIN+01  *INCREMENT TIME BY 1
  2 56 DB
  2 58 3D        LDX     2       *****************
  2 59 4E        TCY     7       *SET TIME SET KEY FLAG
  2 60 30        SBIT    TIMST   *****************
```

```
0 2 61 98 DSPLAY  BR     SHOZRO  *EXIT ROUTINE AND DISPLAY TIME
0 2 62 10 GOBACK  BL     AUTMAN
0 2 62 9E
                *
                *
                *
0 3  0 1F               BL      INIT    *POWER UP COMMAND
0 3  0 80
                *
                ******************************
                **           AUTO           **
                ******************************
0 3  2 4B DOAUTO  TCY    13
0 3  3 38         TBIT1  PRGMFL  *PROGRAM MODE?
0 3  4 B7         BR     AUTOTS
0 3  5 C9         CALL   R2KEYS
0 3  6 38         TBIT1  0       *TIME SET?
0 3  7 92         BR     TSETVA
                ****************************************************
                *    CONTROL KEY LIGHT TOGGLE--
                *    TURN ON OR OFF LIGHTS
                ****************************************************
0 3  8 13         BL     DUPRUT
0 3  8 8B
0 3 10 C9 AUTOTS  CALL   R2KEYS
0 3 11 38         TBIT1  0       *TIME SET?, X= 0
0 3 12 B5         BR     CHKSTP
0 3 13 4F         TCY    15      *********************
0 3 14 35         RBIT   STOPFL  *RESET STOP FLAG
0 3 15 3D         LDX    2       *********************
0 3 16 4E         TCY    7       *RESET TIME SET KEY FLAG
0 3 17 34         RBIT   TIMST   *********************
0 3 18 19         BL     PRGCTL
0 3 18 80
0 3 20 4F CHKSTP  TCY    15      *X= 0
  3 21 39         TBIT1  STOPFL  *STOP FLAG?
0 3 22 88         BR     ATMAN
0 3 23 47         TCY    14
0 3 24 34         RBIT   RSTRFL
0 3 25 18 PRGMTS  CALLL  REST30  *X=2,Y=3
0 3 25 E2
0 3 27 38         TBIT1  CNTTGL  *TOGGLE FLAG?
0 3 28 A2         BR     E2PTM
0 3 29 4E CONT30  TCY    7
0 3 30 38         TBIT1  TIMST   *IF TS KEY IS PRESSED, GO TEST 1/2 SEC
0 3 31 86         BR     CALLL   *
0 3 32 4A HLDOFF  TCY    5       *IF NOT PRESSED
0 3 33 30         SBIT   HOLDOF  *SET HOLDOFF FLAG
0 3 34 11         BL     AD30+1  *AND ADD 30 MIN TO PROGRAM TIME
0 3 34 92
0 3 36 13 CALLL   CALLL  AT2HZ
0 3 36 DE
0 3 38 38         TBIT1  CYCLE   *1/2 SECOND?; X= 2, Y= 6
0 3 39 9A         BR     GOAD30
0 3 40 88         BR     ATMAN
0 3 41 4A GOAD30  TCY    5
0 3 42 11         BL     TSTHLD
0 3 42 9B
0 3 44 14 TSETVA  BL     TSKEY
0 3 44 83
0 3 46 10 ATMAN   BL     AUTMAN
  3 46 9E
0 3 48 12 E2PTM   BL     EXSPTM
0 3 48 AC
                *
0 3 50 3C R2KEYS  LDX    0
0 3 51 44         TCY    2
0 3 52 B2         BR     SETOUT
0 3 53 3C R1KEYS  LDX    0
0 3 54 48         TCY    1
0 3 55 0D SETOUT  SETR
0 3 56 08         TKA            *CHECK FOR TIME SET KEY
```

```
0 3 57 0C          RSTR
0 3 58 03          TAM
0 3 59 0F          RETN
                *
0 3 60 41  TOAMAN  TCY    8
0 3 61 64          TCMIY  2           *RESET 2 SEC COUNTER (NO CONTROL KEY)
0 3 62 10          BL     AUTMAN
0 3 62 9E
                *
                ******************************************
                *
                *
                *
0 4  0 3D  SAVPTM  LDX    2           *SAVE PROGRAM TIME
  4  1 4B          TCY    13
  4  2 21          TMA                *GET STATUS
0 4  3 CC          CALL   SETUP
0 4  4 03          TAM                *STORE AT LOCATION N
0 4  5 3D          LDX    2
0 4  6 43          TCY    12
0 4  7 21          TMA                *GET HOURS
0 4  8 CC          CALL   SETUP
0 4  9 2B          IYC
0 4 10 03          TAM                *STORE AT LOCATION N+1
0 4 11 3D          LDX    2
0 4 12 4D          TCY    11
0 4 13 22          TMY
0 4 14 5C          YNEC   3
0 4 15 BA          BR     ONZHR
0 4 16 CC          CALL   SETUP
0 4 17 30          SBIT   0           *SET HALF HOUR FLAG
0 4 18 AB          BR     TOSHO
0 4 19 CC  ONZHR   CALL   SETUP
0 4 20 34          RBIT   0           *RESET HALF HOUR FLAG (ON THE HOUR)
0 4 21 14  TOSHO   BL     SHOZRO
0 4 21 98
                *
0 4 23 4C  EXSPTM  TCY    3
0 4 24 34          RBIT   CNTTGL      *RESET TOGGLE FLAG
0 4 25 CC          CALL   SETUP
  4 26 57          YNEC   14
0 4 27 A3          BR     AD2TOM      *ONE LOCATION LEFT?
0 4 28 3D          LDX    2
0 4 29 42          TCY    4
0 4 30 30          SBIT   MEMFUL      *YES--SET MEMORY FULL FLAG
0 4 31 4B          TCY    13
0 4 32 35          RBIT   HFFLFL      *AND TURN OFF PROGRAM LIGHT STATUS
0 4 33 37          RBIT   ONOFFL
0 4 34 9A          BR     GO+30
0 4 35 3C  AD2TOM  LDX    0           *NO--INCREMENT LOCATION POINTER BY 2
0 4 36 45          TCY    10
0 4 37 28          IMAC
0 4 38 0E          IA
0 4 39 2E          XMA
0 4 40 3D          LDX    2
0 4 41 1C  GO+30   BL     CONT30
0 4 41 8B
                *
                *THE AUTO MODE BEGINS HERE AT GOCATO
                *
0 4 43 3D  GOCATO  LDX    2
0 4 44 41          TCY    8
0 4 45 38          TBIT1  PFLAG       *IS THE POWER FAIL FLAG SET?
0 4 46 93          BR     AAAMMM      *YES--GO TO DUPRUT TO CHECK CONTROL
  4 47 48          TCY    1           *KEY
  4 48 30          SBIT   AUTOFL      *OTHERWISE--SET AUTO MODE FLAG
  4 49 1C          BL     DOAUTO      *AND DO THE AUTO ROUTINE
0 4 49 83
0 4 51 13  AAAMMM  BL     DUPRUT
0 4 51 8B
                *
0 4 53 3C  SETUP   LDX    0           *SETUP WILL GO TO THE LOCATION
0 4 54 47          TCY    14          *IN RAM POINTED TO BY EITHER THE
```

```
0 4 55 38          TBIT1   RSTRFL  *NEW ENTRY POINTER OR THE REVIEW
0 4 56 AA          BR      TCYPTR  *POINTER. THIS WILL ALLOW EITHER
0 4 57 45          TCY     10      *A NEW TIME TO BE ENTERED OR THE
0 4 58 94          BR      CONSET  *STATUS TO BE CHANGED ON A PREVIOUSLY
0 4 59 49 TCYPTR   TCY     9       *ENTERED TIME.
0 4 60 22 CONSET   TMY
  4 61 3E          LDX     1
0 4 62 0F          RETN
                *
                *
                *
                *
                *AGAIN IS A CONTINUATION OF THE COMPARE ROUTINE
                *
0 5  0 1B AGAIN    CALLL   MODCHK
0 5  0 CA
0 5  2 3A          TBIT1   AMPMFL
0 5  3 BD          BR      PM
0 5  4 EA          CALL    NUSTUP
0 5  5 3A          TBIT1   1
0 5  6 AF          BR      NOMTCH
0 5  7 BC          BR      SAME
0 5  8 EA PM       CALL    NUSTUP
0 5  9 3A          TBIT1   1
0 5 10 BC          BR      SAME
0 5 11 1E NOMTCH   BL      NOMCH   *AFTER CHECKING THE AM/PM FLAGS
0 5 11 A2
                *                  THERE IS NO MATCH IN THIS LOCATION.
0 5 13 1B SAME     CALLL   MODCHK  *REAL TIME AM/PM FLAG MATCHES
0 5 13 CA
0 5 15 43          TCY     12      *PROGRAMMED AM/PM/FLAG
0 5 16 21          TMA
0 5 17 EA          CALL    NUSTUP
0 5 18 2B          IYC
0 5 19 27          SAMAN           *SUBTRACT REAL TIME HOURS FROM
0 5 20 40          TCY     0       *PROGRAMMED TIME HOURS
0 5 21 02          YNEA
0 5 22 AF          BR      NOMTCH  *THEY ARE NOT EQUAL--NO MATCH
                *
                *HOURS MATCH
                *
  5 23 1B          CALLL   MODCHK
0 5 23 CA
0 5 25 4D COMP10   TCY     11
0 5 26 26          MNEZ
0 5 27 9C          BR      CHEKHF
0 5 28 EA          CALL    NUSTUP  *10'S OF MINUTES=0
0 5 29 38          TBIT1   0       *IS SET TIME ON THE HOUR?
0 5 30 AF          BR      NOMTCH  *NO--NO MATCH
0 5 31 B6          BR      CHKRND  *YES--10'S OF MINUTES MATCH
                *                   GO CHECK RANDOM MINUTES
0 5 32 22 CHEKHF   TMY
0 5 33 5C          YNEC    3       *10'S OF MINUTES=3?
0 5 34 AF          BR      NOMTCH  *NO--NO MATCH
0 5 35 EA          CALL    NUSTUP
0 5 36 38          TBIT1   0       *YES--CHECK SET TIME FOR ON HALF HOUR
0 5 37 B6          BR      CHKRND  *10'S OF MINUTES MATCH GO CHECK RANDOM
0 5 38 AF          BR      NOMTCH
                *
0 5 39 3D CHKRND   LDX     2
0 5 40 4B          TCY     13
0 5 41 38          TBIT1   PRGMFL  *CHECK PROGRAM FLAG
0 5 42 99          BR      PCOMP   *MATCH IN PROGRAM MODE
                *
0 5 43 3F          LDX     3
0 5 44 19          CALLL   SAVRND
0 5 44 E9
  5 46 3F          LDX     3       *NOT PRG MODE, COMPARE RANDOM TIME
0 5 47 45          TCY     10
0 5 48 21          TMA             *ACC <-- REAL TIME MINUTES
0 5 49 3C          LDX     0
```

```
0 5 50 43           TCY     12      *RANDOM TIME LOC POINTER
0 5 51 22           TMY
0 5 52 1E           BL      ACOMP   *GO TO AUTO MODE COMPARE
0 5 52 A3
          *
0 5 54 45  PCOMP    TCY     10      *IF IN PROGRAM MODE
0 5 55 26           MNEZ            *IF MINUTES NOT EQUAL TO 0
0 5 56 AF           BR      NOMTCH  *NO MATCH
  5 57 11           BL      MATCH   *OTHERWISE, MATCH
  5 57 80
          *
0 5 59 3C  NUSTUP   LDX     0       *GOES TO RAM LOCATON POINTED TO
0 5 60 49           TCY     9       *BY REVIEW POINTER.
0 5 61 22           TMY
0 5 62 3E           LDX     1
0 5 63 0F           RETN
          *
          *
          *
0 6  0 3C  NEWTGL   LDX     0
0 6  1 4F           TCY     15
0 6  2 3B           TBIT1   CNTKEY  *WAS THERE A PREVIOUS CONTROL KEY?
0 6  3 AB           BR      BEGDEC  *YES--GO DECREMENT COUNTER
0 6  4 33           SBIT    CNTKEY  *NO--THEN SET CONTROL KEY FLAG
          *
0 6  5 1B  CLMDCK   CALLL   MODCHK
0 6  5 CA
0 6  7 3B  TOGLLL   TBIT1   ONOFFL  ***************
0 6  8 9E           BR      FLGOFF  *
0 6  9 31           SBIT    HFFLFL  *AND TOGGLE LIGHT STATUS
0 6 10 33           SBIT    ONOFFL  *
0 6 11 B9           BR      OUTTGL  *
0 6 12 35  FLGOFF   RBIT    HFFLFL  *
0 6 13 37           RBIT    ONOFFL  **********
0 6 14 0F  OUTTGL   RETN
          *
0 6 15 3D           LDX     2
0 6 16 38           TBIT1   PRGMFL
0 6 17 BA           BR      SETBIT  *IF IN PRGM MODE, SET TOGGLE FLAG
0 6 18 AB           BR      BEGDEC  *OTHERWISE GO DECREMENT COUNTER
0 6 19 4C  SETBIT   TCY     3
0 6 20 30           SBIT    CNTTGL
          *
0 6 21 13  BEGDEC   CALLL   AT3HZ
0 6 21 C0
0 6 23 38           TBIT1   CYCLE
0 6 24 A1           BR      D2SEC   *1/3 SECOND ELAPSED?
0 6 25 8D           BR      RETURN  *NO--RETURN
  6 26 34  D2SEC    RBIT    CYCLE
  6 27 3C           LDX     0
0 6 28 41           TCY     8
0 6 29 2A           DMAN            *YES--DECREMENT COUNTER
0 6 30 86           BR      SAVNSH  *2 SECONDS ELAPSED?
0 6 31 64           TCMIY   2       *YES--RESET 2 SEC COUNTER
0 6 32 1B           CALLL   MODCHK
0 6 32 CA
0 6 34 35  TGLHLF   RBIT    HFFLFL  *AND SET TO DIM
0 6 35 8D           BR      RETURN
0 6 36 03  SAVNSH   TAM
0 6 37 3D  RETURN   LDX     2       *NO--RETURN
0 6 38 4B           TCY     13
0 6 39 38           TBIT1   PRGMFL
0 6 40 A9           BR      TOSAVP  *IF PROGRAM MODE-SAVE PROGRAM TIME
0 6 41 13           BL      CONDUP  *IF NOT GO TO START
0 6 41 A2
          *
0 6 43 12  TOSAVP   BL      SAVPTM
0 6 43 80
          *
0 6 45 3D  RSTFLS   LDX     2
0 6 46 4B           TCY     13
0 6 47 60           TCMIY   0       *RESET PRGM FLAGS
```

```
*0 6 48 48            TCY     1
 0 6 49 38            TBIT1   AUTOFL   *IF AUTO FLAG IS SET
   6 50 A6            BR      RSTAFL
 0 6 51 0F            RETN
 0 6 52 34  RSTAFL    RBIT    AUTOFL   *RESET AUTO FLAG
 0 6 53 40            TCY     0
 0 6 54 34            RBIT    PFACK    *AND RESET PFACK FLAG
 0 6 55 0F            RETN
                *
 0 6 56 3D  CALL12    LDX     2        *THIS IS PART OF THE ROUTINE TO
 0 6 57 48            TCY     1        *DISPLAY 12:00 IN TIME SET.
 0 6 58 11            CALLL   TWELVE
 0 6 58 F0
 0 6 60 15            BL      CALFIN
   6 60 91
                *
                *
 0 7  0 1F            BL      INIT     *POWER UP COMMAND
 0 7  0 80
                *
                *
   7  2 3F  SEND4B    LDX     3        *LOAD DISPLAY DATA INDIRECTLY
 0 7  3 21            TMA
 0 7  4 3C  DIR4B     LDX     0        *SAVE DATA IN OUTPUT BUFFER
 0 7  5 44            TCY     2
 0 7  6 03            TAM
                *
 0 7  7 4C            TCY     3        *LOAD LOOP COUNTER FOR 4 BITS OF OUTPUT
 0 7  8 23            TYA
 0 7  9 48            TCY     1
 0 7 10 20            TAMIY            *Y=1 CONTAINS LOOP COUNTER, THEN GOTO OUT BUFF
 0 7 11 B5            BR      LOOP
                *
 0 7 12 3D  SEND3B    LDX     2        *LOAD DISPLAY DATA INDIRECTLY
 0 7 13 21            TMA
 0 7 14 3C  DIR3B     LDX     0        *SAVE DATA IN OUTPUT BUFFER
 0 7 15 44            TCY     2
 0 7 16 03            TAM
                *
 0 7 17 23            TYA              *LOAD LOOP COUNTER FOR 3 BITS OF OUTPUT
 0 7 18 48            TCY     1
 0 7 19 20            TAMIY            *Y=1 CONTAINS LOOP COUNTER, THEN GOTO OUT BUFF
                *
 0 7 20 21  LOOP      TMA
 0 7 21 25            AMAAC            *SHIFT OUTPUT DATA LEFT
 0 7 22 B0            BR      OUTHI    *IF THERE'S A CARRY, THEN OUTPUT A ONE
   7 23 0C            RSTR             *IF NOT, OUTPUT A ZERO
 0 7 24 A1            BR      OUTDEC
 0 7 25 0D  OUTHI     SETR
 0 7 26 03  OUTDEC    TAM              *STORE SHIFTED VALUE
 0 7 27 48            TCY     1
 0 7 28 0D            SETR             *CLOCK DATA TO DISPLAY
 0 7 29 0C            RSTR
 0 7 30 2A            DMAN             *DECREMENT LOOP COUNTER
 0 7 31 B8            BR      TOLOOP   *COUNTED OUT? NO, THEN LOOP
 0 7 32 0F            RETN             *OTHERWISE RETURN
                *
 0 7 33 20  TOLOOP    TAMIY
 0 7 34 B5            BR      LOOP
                *
                *
 0 7 35 02  ACOMP     YNEA             *RANDOM MIN= REAL MINUTES?
 0 7 36 A2            BR      NOMCH    *NO: GO TO NOMATCH
 0 7 37 3D            LDX     2
 0 7 38 47            TCY     14       *YES--THEN CHECK TO SEE IF THE SECONDS
 0 7 39 22            TMY              *COUNTER=59
 0 7 40 59            YNEC    9        *THIS IS DONE SO THAT THERE WILL ONLY
 0 7 41 A2            BR      NOMCH    *BE A MATCH AT A PARTICULAR SET TIME
 0 7 42 4F            TCY     15       *FOR ONE SECOND...OTHERWISE THE LIGHT
 0 7 43 22            TMY              *STATUS KEEPS GETTING RESET AND THE
 0 7 44 5A            YNEC    5        *LIGHT SETTING CANNOT BE OVERRIDDEN
 0 7 45 A2            BR      NOMCH    *MANUALLY FOR ONE MINUTE.
```

```
      7 46 18              BL       TOMTCH
    0 7 46 AA
                  *
    0 7 48 44 NOMCH  TCY      2         *INCREMENT SET TIME POINTER
    0 7 49 23              TYA
    0 7 50 3C              LDX      0
    0 7 51 49              TCY      9
    0 7 52 25              AMAAC              *GO TO NEXT SET TIME
    0 7 53 8A              BR       TOSHOT    *CHECKED ALL TIMES--NO MATCHING SET TIMES
    0 7 54 03 AGGIN  TAM
    0 7 55 1A              BL       AGAIN    *GO BACK AND TRY THE NEXT SET TIME
    0 7 55 80
                  *
    0 7 57 14 TOSHOT BL    SHOZRO
    0 7 57 98
                  *
    0 7 59 34 DEC2CT RBIT   CYCLE    *1/3 SEC ELAPSED,DEC 2 SEC COUNTER
    0 7 60 3C              LDX      0
    0 7 61 41              TCY      8
    0 7 62 15              BL       DC2CT
    0 7 62 B4
                  *
                  *
    0 8  0 3D MATCH  LDX      2
    0 8  1 4B              TCY      13
    0 8  2 38              TBIT1    PRGMFL   *PROGRAM MODE?
    0 8  3 9E              BR       STSTOP
      8  4 1A              CALLL    NUSTUP   *NO: AUTO MODE
    0 8  4 EA
    0 8  6 21              TMA
    0 8  7 3F              LDX      3
    0 8  8 4B              TCY      13
    0 8  9 03              TAM               *REAL TIME STATUS <-- SET TIME STATUS
    0 8 10 14 ENDMCH BL    SHOZRO
    0 8 10 98
                  *
   *0 8 12 3C STSTOP LDX      0         *YES: PROGRAM MODE
    0 8 13 4F              TCY      15
    0 8 14 31              SBIT     STOPFL   *SET STOP FLAG
    0 8 15 47              TCY      14
    0 8 16 30              SBIT     RSTRFL   *SET RESTORE FLAG
    0 8 17 1A              CALLL    NUSTUP
    0 8 17 EA
    0 8 19 21              TMA
    0 8 20 3D              LDX      2
    0 8 21 4B              TCY      13
    0 8 22 03              TAM               *SET TIME STATUS --> PROGRAM TIME STATUS
    0 8 23 30              SBIT     PRGMFL   *SET PROGRAM FLAG
    0 8 24 B7              BR       ENDMCH
                  *
                  *
    0 8 25 38 TWELVE TBIT1    AUTOFL   *AUTO MODE?
      8 26 9C              BR       TWELVP
    0 8 27 3F TWELVM LDX      3
    0 8 28 45              TCY      10
    0 8 29 69              TCMIY    9
    0 8 30 6A              TCMIY    5
    0 8 31 8D              BR       RETTWL   *NO--LOAD :59 TO REAL TIME
    0 8 32 4B TWELVP TCY      13
    0 8 33 30              SBIT     PRGMFL   *YES--SET PROGRAM FLAG
    0 8 34 45              TCY      10
    0 8 35 60              TCMIY    0
    0 8 36 6C              TCMIY    3         *AND LOAD :30 TO PROGRAM TIME
    0 8 37 0F RETTWL RETN
                  *
    0 8 38 38 TSTHLD TBIT1    HOLDOF  *TEST HOLDOFF FLAG
    0 8 39 9A              BR       RSTHLD  *IF SET RESET AND GO BACK
    0 8 40 92              BR       AD30+1  *IF NOT ADD 30 MIN TO PROGRAM TIME
    0 8 41 34 RSTHLD RBIT    HOLDOF
    0 8 42 10              BL       AUTMAN
    0 8 42 9E
    0 8 44 17 AD30+1 CALLL    MIN+10
```

```
0 8 44 C6
0 8 46 17           CALLL   MIN+10
0 8 46 C6
0 8 48 17           CALLL   MIN+10  *BUF TIME + 30 MIN
0 8 48 C6
0 8 50 4E           TCY     7
  8 51 30           SBIT    TIMST   *SET TIME SET KEY FLAG
0 8 52 3C  COMPAR   LDX     0       *COMPARE SET TIME WITH REAL TIME(X=2)
0 8 53 49           TCY     9       *COMPARE SET TIME POINTER= 0
0 8 54 60           TCMIY   0       **SET TIME POINTER=0
0 8 55 15  EXZERO   CALLL   ZEROX
0 8 55 C0
0 8 57 3B           TBIT1   3
0 8 58 90           BR      CONCOM
0 8 59 17           CALLL   UPDTIM
0 8 59 C0
0 8 61 B2           BR      EXZERO
0 8 62 1A  CONCOM   BL      AGAIN
  8 62 80
                    *
                    *
                    *
0 9  0 1C  PRGCTL   CALLL   R1KEYS
0 9  0 CC
0 9  2 38           TBIT1   0       *CONTROL KEY?
  9  3 BD           BR      RESTOR
  9  4 4F           TCY     15
0 9  5 37           RBIT    CNTKEY  *NO--RESET CONTROL KEY FLAG
0 9  6 1C           BL      TOAMAN  *AND GO TO START
0 9  6 94
                    *
*0 9  8 18 RESTOR   CALLL   REST30  *YES--RESET 30 SECOND COUNTER
*0 9  8 E2
0 9 10 3C           LDX     0
0 9 11 47           TCY     14
0 9 12 38           TBIT1   RSTRFL  *IS THE RESTORE FLAG SET?
0 9 13 9D           BR      TOOTGL  *YES--TOGGLE LIGHT STATUS
                    *
0 9 14 3D  CHKFUL   LDX     2
0 9 15 42           TCY     4       *NO--
0 9 16 38  PRMEM    TBIT1   MEMFUL
0 9 17 B5           BR      DUMPEE  *IF PROG MEM FULL- SHOW ERROR MESSAGE
0 9 18 16  TOOTGL   BL      NEWTGL  *OTHERWISE TOGGLE LIGHT STATUS
0 9 18 80
                    *
0 9 20 44  DUMPEE   TCY     2
0 9 21 1D  EEES     CALLL   SENDO
0 9 21 D5
0 9 23 4A           TCY     5
0 9 24 1E           CALLL   SEND4B
0 9 24 C3
  9 26 4A           TCY     5
0 9 27 1E           CALLL   SEND4B
0 9 27 C3
0 9 29 4A           TCY     5
0 9 30 1E           CALLL   SEND4B
0 9 30 C3
0 9 32 1D           CALLL   SENDO
0 9 32 D5
0 9 34 4E           TCY     7
0 9 35 1E           CALLL   SEND4B
0 9 35 C3
0 9 37 4E           TCY     7
0 9 38 1E           CALLL   SEND4B
0 9 38 C3
0 9 40 43           TCY     12
0 9 41 10           BL      FINEEE
0 9 41 95
                    *
0 9 43 45  SAVRND   TCY     10      *SAVE RANDOM TIME (X=3)
0 9 44 26           MNEZ
0 9 45 A8           BR      XITSAV
```

```
0 9 46 4D            TCY     11
0 9 47 26            MNEZ
0 9 48 89            BR      TSTHLF
0 9 49 8C            BR      SAVE
0 9 50 22   TSTHLF   TMY
  9 51 5C            YNEC    3
0 9 52 A8            BR      XITSAV
0 9 53 3C   SAVE     LDX     0       *IF MINUTES=00 OR 30 THEN SAVE
0 9 54 4D            TCY     11
0 9 55 21            TMA
0 9 56 43            TCY     12
0 9 57 79            ALEC    9       *IF RANDOM NUMBER <= 9 SAVE IT
0 9 58 94            BR      SAVXIT
0 9 59 06            A6AAC           *OTHERWISE, ADD 6 AND SAVE
0 9 60 03   SAVXIT   TAM
0 9 61 0F   XITSAV   RETN
            *
            *
0 A  0 3C   ZEROX    LDX     0
0 A  1 48            TCY     1
0 A  2 08            TKA
  A  3 03            TAM
  A  4 3B            TBIT1   3
0 A  5 9E            BR      KHI
0 A  6 44   KLOW     TCY     2
0 A  7 08            TKA
0 A  8 03            TAM
0 A  9 3B            TBIT1   3
0 A 10 9D            BR      ZERONE
0 A 11 BF            BR      KLOW
0 A 12 44   KHI      TCY     2
0 A 13 08            TKA
0 A 14 03            TAM
0 A 15 3B            TBIT1   3
0 A 16 9E            BR      KHI
0 A 17 AC            BR      ONEZER
0 A 18 3F   ZERONE   LDX     3       *ZERO CROSS INPUT TRANSITION 0->1
0 A 19 4B            TCY     13
0 A 20 3B            TBIT1   ONOFFL
0 A 21 AE            BR      FIRETC  *IF LIGHT ON--FIRE TRIAC
0 A 22 B6            BR      EXITZX  *OTHERWISE RETURN
0 A 23 3F   ONEZER   LDX     3
0 A 24 4B            TCY     13      *ZERO CROSS INPUT TRANSITION 1->0
0 A 25 39            TBIT1   HFFLFL
0 A 26 85            BR      LTHLF
0 A 27 B6            BR      EXITZX
0 A 28 3B   LTHLF    TBIT1   ONOFFL
  A 29 AE            BR      FIRETC  *IF LIGHT ON FULL--FIRE TRIAC
0 A 30 B6            BR      EXITZX  *OTHERWISE RETURN
0 A 31 0B   FIRETC   CLO
0 A 32 4F            TCY     15
0 A 33 2F   HOLDIT   CLA
0 A 34 2C            DYN
0 A 35 B8            BR      HOLDIT  *DELAY 16 X 3 INSTRUCTIONS BEFORE TRIAC
0 A 36 0E            IA              *FIRING
0 A 37 0A            TDO
0 A 38 0B            CLO
0 A 39 3C   EXITZX   LDX     0
0 A 40 44            TCY     2
0 A 41 0F            RETN
            *
0 A 42 2A   DC2CT    DMAN
0 A 43 A8            BR      PREBAC
0 A 44 6A            TCMIY   5       *RESET 2 SEC COUNTER
0 A 45 16            BL      CALL12  * 12:00 TO BUFFER
0 A 45 A5
0 A 47 13   CALFIN   CALLL   FIN12+
0 A 47 F2
0 A 49 40            TCY     0
0 A 50 30            SBIT    PFACK   *SET POWER FAIL ACKNOWLEDGED FLAG
0 A 51 48            TCY     1
0 A 52 38            TBIT1   AUTOFL  *AUTO OR MAN MODE?
```

```
  A 53 8A           BR     PREDIS
  A 54 41           TCY    8
O A 55 34           RBIT   PFLAG  *MAN -- RESET POWER FAIL FLAG
O A 56 AA           BR     VIEW   *DISPLAY AND EXIT
O A 57 4B PREDIS   TCY    13
O A 58 30           SBIT   PRGMFL *SET PROGRAM FLAG
O A 59 14 VIEW     BL     SHOZRO
O A 59 9B
O A 61 03 PREBAC   TAM
O A 62 10           BL     AUTMAN
O A 62 9E
                *
                *
                *
O B  0 1F           BL     INIT   *POWER UP COMMAND
O B  0 80
                *
                *      OUTPUT 3 SEGMENTS TO THE DISPLAY AFTER
                *      CALCULATING THE VALUE FROM THE STORED TIME
                *
O B  2 1E SNDTEN   CALLL  SEND3B *3 BITS-->DISPLAY
O B  2 DE
                *
                *      OUTPUT THE COLON ANNUNCIATOR
                *
O B  4 3D COLON    LDX    2
O B  5 49           TCY    9
O B  6 38           TBIT1  COLFL  *TEST THE COLON FLAG
O B  7 B7           BR     ONCOL  *IF 1, SEND 1 TO COLON ANNUN
O B  8 D5 OFFCOL   CALL   SEND0  *IF 0, SEND 0 TO COLON ANNUN
O B  9 AF           BR     DIG3
O B 10 F2 ONCOL    CALL   SEND1
                *
                *      OUTPUT 3 SEGMENTS OF 10'S OF MINUTES DISPLAY
                *
O B 11 1B DIG3     CALLL  MODCHK *SELECT REAL OR PRGM TIME
O B 11 CA
O B 13 4D           TCY    11
O B 14 22           TMY           *10' OF MIN-->Y
O B 15 1E           CALLL  SEND3B *3 BITS-->DISPLAY
O B 15 DE
                *
                *      OUTPUT 3 SEGMENTS OF MINUTES DISPLAY
                *
O B 17 1B           CALLL  MODCHK *SELECT REAL OR PRGM TIME
O B 17 CA
O B 19 45           TCY    10
O B 20 22           TMY           *MINUTES-->Y
O B 21 1E           CALLL  SEND3B *3 BITS-->DISPLAY
O B 21 DE
                *
                *      OUTPUT DIM ANNUNCIATOR
                *
O B 23 3C           LDX    0
O B 24 4F           TCY    15
O B 25 38           TBIT1  DIMANN *TEST DIM FLAG
O B 26 8B           BR     DIMON  *IF 1, OUTPUT 1 TO DIM ANNUN
O B 27 D5           CALL   SEND0  *IF 0, OUTPUT 0 TO DIM ANNUN
O B 28 97           BR     ANNUN
O B 29 F2 DIMON    CALL   SEND1
                *
                *      OUTPUT PROGRAM ANNUNCIATOR
                *
O B 30 3D ANNUN    LDX    2
O B 31 4B           TCY    13
O B 32 38           TBIT1  PRGMFL *TEST PROGRAM FLAG
O B 33 86           BR     PRGON  *IF FLAG SET, SEND 1 TO PRGM ANNUN
O B 34 D5           CALL   SEND0  *IF NOT, SEND 0 TO PRGM ANNUN
  B 35 8D           BR     TSTAP
  B 36 F2 PRGON    CALL   SEND1
                *
                *      OUTPUT PM ANNUNCIATOR
```

```
O B 37 1B  TSTAP   CALLL  MODCHK   *SELECT REAL OR PRGM TIME (Y=13)
O B 37 CA
O B 39 3A          TBIT1  AMPMFL   *TEST AM/PM FLAG
O B 40 A9          BR     PMDIS2   *IF SET, SEND 1 TO PM DISPLAY
O B 41 D5  AMDIS2  CALL   SEND0    *IF NOT, SEND 0 TO PM DISPLAY
O B 42 92          BR     FINSH0   *LOAD BITS INTO DISPLAY DRIVER
O B 43 F2  PMDIS2  CALL   SEND1
           *
           *       LOAD BITS INTO THE DISPLAY BUFFER
           *
O B 44 10  FINSH0  BL     TOLOAD
O B 44 B2
           *
           *
O B 46 45  CLCTEN  TCY    10
O B 47 23          TYA
O B 48 43          TCY    12
O B 49 27          SAMAN           *SUBTRACT 10 FROM TIME
O B 50 8C          BR     TRYOUT   *IF TIME > 10, RESULT-->Y
O B 51 22          TMY             *IF 10 > TIME, TIME-->Y
O B 52 99          BR     GETOUT   *GOBACK AND OUTPUT
O B 53 24  TRYOUT  TAY
O B 54 0F  GETOUT  RETN
           *
O B 55 44  SEND1   TCY    2        *SEND DATA=1 AND CLOCK LATCH
O B 56 0D          SETR
O B 57 94          BR     CLKOUT
O B 58 44  SEND0   TCY    2        *SEND DATA=0 AND CLOCK LATCH
O B 59 0C          RSTR
O B 60 48  CLKOUT  TCY    1
O B 61 0D          SETR
O B 62 0C          RSTR
O B 63 0F          RETN
           *
           *
           *AT3HZ AND AT2HZ CHECK THE ZERO CROSSING COUNTER.
           *IF, FOR THE AT3HZ ROUTINE, THE COUNTER=00, 20, OR 40
           *THEN THE CYCLE FLAG WILL BE SET. IF, FOR THE AT2HZ
           *ROUTINE, THE COUNTER=00, OR 30, THEN THE CYCLE FLAG
           *WILL BE SET.
           *
O C  0 3F  AT3HZ   LDX    3
O C  1 47          TCY    14
O C  2 26          MNEZ
O C  3 A1          BR     OUTHZ
O C  4 2B          IYC
O C  5 22          TMY
O C  6 52          YNEC   4
O C  7 BB          BR     TRYTWO
O C  8 AC          BR     LEAVE
O C  9 54  TRYTWO  YNEC   2
O C 10 AB          BR     TRYZER
O C 11 AC          BR     LEAVE
O C 12 3F  AT2HZ   LDX    3
O C 13 47          TCY    14
O C 14 26          MNEZ
O C 15 A1          BR     OUTHZ
O C 16 2B          IYC
O C 17 22          TMY
O C 18 5C          YNEC   3
O C 19 AB          BR     TRYZER
O C 20 AC          BR     LEAVE
O C 21 50  TRYZER  YNEC   0
O C 22 A1          BR     OUTHZ
   C 23 3D  LEAVE   LDX    2
O C 24 46          TCY    6
O C 25 30          SBIT   CYCLE
O C 26 3D  OUTHZ   LDX    2
O C 27 46          TCY    6
O C 28 0F          RETN
           *
```

```
0 C 29 1C DUPRUT  CALLL  R1KEYS
0 C 29 CC
0 C 31 38         TBIT1  0       *CNTRL KEY?
0 C 32 88         BR     LIGHTS  *YES--TOGGLE LIGHT STATUS
0 C 33 4F         TCY    15      *NO--
0 C 34 37         RBIT   CNTKEY  *RESET CTRL KEY FLAG
0 C 35 41         TCY    8
0 C 36 6A         TCMIY  5       *RESET 2 SEC COUNTER (NO CNTRL KEY)
0 C 37 3D         LDX    2
0 C 38 41         TCY    8
0 C 39 38 PFAIL?  TBIT1  PFLAG   *POWER FAIL FLAG SET?
0 C 40 93         BR     ATMANA  *YES--GO TO START
0 C 41 48         TCY    1       *NO--CONTINUE
0 C 42 38         TBIT1  AUTOFL  *AUTO MODE?
0 C 43 8C         BR     CMPARE  *YES--GO TO COMPARE ROUTINE
0 C 44 14         BL     SHOZRO  *NO--GO UPDATE THE DISPLAY
0 C 44 98
                *
  C 46 16 LIGHTS  BL     NEWTGL
  C 46 80
                *
0 C 48 3C CONDUP  LDX    0
0 C 49 4F         TCY    15
0 C 50 33         SBIT   CNTKEY  *SET THE CONTROL KEY FLAG
0 C 51 10 ATMANA  BL     AUTMAN
0 C 51 9E
                *
0 C 53 11 CMPARE  BL     COMPAR
0 C 53 A6
                *
0 C 55 6D FIN12+  TCMIY  11      *FINISH THE CALL TWELVE ROUTINE
  C 56 36         RBIT   AMPMFL
  C 57 3C         LDX    0
0 C 58 4A         TCY    5
0 C 59 69         TCMIY  9       *
0 C 60 6A         TCMIY  5       *RESET 30 SEC COUNTER
0 C 61 65         TCMIY  10      *RESET 5 SEC COUNTER
0 C 62 3D         LDX    2
0 C 63 0F         RETN
                *
                *
                *       OUTPUT 'ON' ANNUNCIATOR AND CHECK DIM
                *       STATUS FOR LATER OUTPUT OF 'DIM' ANNUNCIATOR
                *       --EITHER 'ON' OR 'DIM' ANNUNCIATORS ARE ON, NOT BOTH
                *
  D  0 CA SHOTIM  CALL   MODCHK
0 D  1 3B STRTSH  TBIT1  ONOFFL  *TEST ON/OFF FLAG
0 D  2 9F         BR     ONRUT1  *IF ON GO TO CHECK FULL/HALF FLAG
0 D  3 D5         CALL   SEND0   *IF OFF SEND 0 TO 'ON' ANNUNCIATOR
0 D  4 B3         BR     RDIMFL  *AND RESET THE DIM FLAG (IF LIGHT IS ON)
0 D  5 39 ONRUT1  TBIT1  HFFLFL  *TEST DIM FLAG (IF LIGHT IS ON)
0 D  6 BC         BR     ONRUT2  *IF LIGHT IS ON FULL, GO SEND 1 TO 'ON' ANNUN
0 D  7 1D         CALLL  SEND0   *LIGHT IS ON HALF, SO SEND 0 TO 'ON' ANNUN
0 D  7 D5
0 D  9 3C         LDX    0       *AND SET DIM FLAG
0 D 10 4F         TCY    15
0 D 11 30         SBIT   DIMANN
0 D 12 9D         BR     NEXT
0 D 13 1D ONRUT2  CALLL  SEND1   *SEND 1 TO 'ON' ANNUNCIATOR
0 D 13 F2
0 D 15 3C RDIMFL  LDX    0       *AND RESET THE DIM FLAG
0 D 16 4F         TCY    15
0 D 17 34         RBIT   DIMANN
                *
                *       OUTPUT FIRST 4 SEGMENTS OF MINUTES DISPLAY
                *
0 D 18 CA NEXT    CALL   MODCHK  *SELECT REAL OR PRGM TIME
0 D 19 45         TCY    10
0 D 20 22         TMY            *TRANSFER MINUTES TO Y REG
0 D 21 1E         CALLL  SEND4B  *4 BITS-->DISPLAY
  D 21 C3
                *
```

```
                *       OUTPUT FIRST 4 SEGMENTS OF 10'S OF MINUTES DISPLAY
                *
 0 D 23 CA              CALL    MODCHK  *SELECT REAL OR PRGM TIME
 0 D 24 4D              TCY     11
 0 D 25 22              TMY             *TRANSFER 10'S OF MIN TO Y REG
 0 D 26 1E              CALLL   SEND4B  *4 BITS--->DISPLAY
 0 D 26 C3
                *
                *       OUTPUT FIRST 4 SEGMENTS OF HOURS DISPLAY
                *       AFTER CALCULATING THE VALUE OF HOURS
                *       FROM THE STORED TIME
                *
 0 D 28 CA              CALL    MODCHK
 0 D 29 1D CONSHO       CALLL   CLCTEN  *CALCULATE THE VALUE FOR HOURS
 0 D 29 C8
 0 D 31 1E              CALLL   SEND4B  *4 BITS--->DISPLAY
 0 D 31 C3
                *
                *       OUTPUT AM ANNUNCIATOR
                *
 0 D 33 CA              CALL    MODCHK  *SELECT REAL OR PRGM TIME
 0 D 34 3A              TBIT1   AMPMFL  *TEST AM/PM FLAG
 0 D 35 B6              BR      PMDIS1  *IF SET, OUTPUT 0 TO AM ANNUN
   D 36 1D AMDIS1       CALLL   SEND1   *IF NOT, OUTPUT 1 TO AM ANNUN
   D 36 F2
 0 D 38 9A              BR      TENHR
 0 D 39 1D PMDIS1       CALLL   SEND0
 0 D 39 D5
                *
                *       OUTPUT 10'S OF HOURS AFTER CALCULATING
                *       THE VALUE FOR THE 10'S FROM THE STORED TIME
                *
 0 D 41 CA TENHR        CALL    MODCHK  *SELECT REAL OR PRGM TIME
 0 D 42 45              TCY     10
 0 D 43 23              TYA
 0 D 44 43              TCY     12
 0 D 45 27              SAMAN           *SUBTRACT TEN FROM HOURS
   D 46 89              BR      OUTONE  *IF THERE WAS A BORROW, OUTPUT A 1
 0 D 47 1D OUTZER       CALLL   SEND0   *IF NOT, OUTPUT A 0 TO 10'S OF HOURS
 0 D 47 D5
 0 D 49 A6              BR      DIG2B
 0 D 50 1D OUTONE       CALLL   SEND1
 0 D 50 F2
                *
 0 D 52 CA DIG2B        CALL    MODCHK  *SELCT REAL OR PRGM TIME
 0 D 53 1D              CALLL   CLCTEN  *CALCULATE VALUE FOR HOURS
 0 D 53 C8
 0 D 55 1D              BL      SNDTEN  *GO TO CONTINUATION
 0 D 55 83
                *
 0 D 57 3D MODCHK       LDX     2
 0 D 58 4B              TCY     13
 0 D 59 38              TBIT1   PRGMFL
 0 D 60 90              BR      OUT
 0 D 61 3F              LDX     3
 0 D 62 0F OUT          RETN
                *
                *
                *
 0 E  0 3F UPDTIM       LDX     3
 0 E  1 47              TCY     14
 0 E  2 2A              DMAN            *DECREMENT UNIT CYCLES
   E  3 90              BR      SAVR1
   E  4 69 DECMSN       TCMIY   9       *RESET UNIT CYCLES
 0 E  5 2A              DMAN            *DECREMENT TENS OF CYCLES
 0 E  6 BB              BR      TEST30
 0 E  7 6A              TCMIY   5       *RESET TENS OF CYCLES
 0 E  8 BC              BR      COLTST
 0 E  9 03 TEST30       TAM
 0 E 10 22              TMY
 0 E 11 54              YNEC    2       *IF 10'S OF MINUTES IS NOT = 2
```

```
O E 12 AO              BR      DONE1    *THEN UPDATE COMPLETE
O E 13 3D   COLTST     LDX     2
O E 14 49              TCY     9        *OTHERWISE CHECK TO SEE IF
O E 15 38              TBIT1   COLFL    *COLON ON?
O E 16 BA              BR      COLOFF   *YES--TURN IT OFF
O E 17 30              SBIT    COLFL    *NO--TURN IT ON
            *                            (IF CYCLES=29 COLON WILL TOGGLE)
O E 18 AO              BR      DONE1
O E 19 34   COLOFF     RBIT    COLFL
O E 20 47   DECSEC     TCY     14
O E 21 2A              DMAN
O E 22 90              BR      SAVR1
O E 23 69              TCMIY   9
O E 24 2A              DMAN
O E 25 90              BR      SAVR1
O E 26 6A              TCMIY   5        *DECREMENT SECONDS
            *
  E 27 3C              LDX     0
O E 28 4D              TCY     11
O E 29 28              IMAC             *INCREMENT RANDOM COUNTER
O E 30 73              ALEC    12       *IF LESS THAN 12 SAVE IT
O E 31 B8              BR      SAVRAN
O E 32 2F              CLA              *OTHERWISE SAVE 0
O E 33 03   SAVRAN     TAM
            *
O E 34 3F              LDX     3
O E 35 9B              BR      MIN+01
O E 36 4D   MIN+10     TCY     11
O E 37 A9              BR      MN1001
O E 38 45   MIN+01     TCY     10       *ADD ONE MINUTE TO REAL TIME
O E 39 28              IMAC             *THIS ROUTINE ALSO TAKES INTO ACCOUNT
O E 40 02              YNEA             *WHAT HAPPENS AS THE MINUTES, 10'S
O E 41 90              BR      SAVR1    *OF MINUTES, HOURS, AND AM/PM REACH
O E 42 60              TCMIY   0        *A CARRY STATE.
O E 43 28   MN1001     IMAC
O E 44 7A              ALEC    5
O E 45 90              BR      SAVR1
O E 46 60              TCMIY   0
O E 47 28              IMAC
O E 48 73              ALEC    12
O E 49 A6              BR      CHKAM1
O E 50 68              TCMIY   1
  E 51 AO              BR      DONE1
  E 52 03   CHKAM1     TAM
O E 53 7D              ALEC    11
O E 54 AO              BR      DONE1
O E 55 4B              TCY     13
O E 56 3A              TBIT1   AMPMFL
O E 57 94              BR      RESETO
O E 58 32              SBIT    AMPMFL
O E 59 AO              BR      DONE1
O E 60 36   RESETO     RBIT    AMPMFL
O E 61 AO              BR      DONE1
O E 62 03   SAVR1      TAM
O E 63 OF   DONE1      RETN
            *
            *
O F  0 3F   INIT       LDX     3        *LOAD SEGMENT DECODE DATA
O F  1 40              TCY     0
O F  2 6E              TCMIY   7
O F  3 62              TCMIY   4
  F  4 67              TCMIY   14
  F  5 67              TCMIY   14
O F  6 6B              TCMIY   13
O F  7 6D              TCMIY   11
O F  8 6D              TCMIY   11
O F  9 66              TCMIY   6
O F 10 6F              TCMIY   15
O F 11 6F              TCMIY   15
O F 12 4B              TCY     13
O F 13 63              TCMIY   12
O F 14 3D              LDX     2
```

```
O F 15 40              TCY     0
O F 16 67              TCMIY   14
O F 17 64              TCMIY   2
O F 18 6B              TCMIY   13      *BIT 3 SETS THE REMOTE TOGGLE FLAG
O F 19 66              TCMIY   6
O F 20 64              TCMIY   2
O F 21 66              TCMIY   6
O F 22 67              TCMIY   14
O F 23 64              TCMIY   2
O F 24 6F              TCMIY   15
O F 25 66              TCMIY   6
O F 26 4B              TCY     13
O F 27 67              TCMIY   14
O F 28 69              TCMIY   9
O F 29 6A              TCMIY   5       *SET SECOND COUNTER
  F 30 3E  CLRSTM LDX  1               ********************
O F 31 40              TCY     0       *
O F 32 2F              CLA             *
O F 33 03  CLRSET TAM                  *LOOP TO CLEAR X=1 REGISTER
O F 34 2B              IYC             *
O F 35 8D              BR      SCOUN   *
O F 36 B8              BR      CLRSET  ********************
O F 37 3C  SCOUN  LDX  0
O F 38 40              TCY     0
O F 39 67              TCMIY   14
O F 40 41              TCY     8
O F 41 6A              TCMIY   5       *SET 2 SECOND COUNTER
O F 42 60              TCMIY   0       *RESET COMPARE SET TIME POINTER
O F 43 60              TCMIY   0       *RESET LOAD SET TIME POINTER
O F 44 60              TCMIY   0       *RESET RANDOM COUNTER
O F 45 4F              TCY     15
O F 46 60              TCMIY   0       *RESET FLAGS
O F 47 42  BEGPF  TCY  4               *START PF ROUTINE
O F 48 10              CALLL   CLRCHR
O F 48 C8
O F 50 4D              TCY     11
O F 51 23              TYA
O F 52 1E              CALLL   DIR4B
O F 52 CF
O F 54 4F              TCY     15
  F 55 23              TYA
  F 56 1E              CALLL   DIR4B
O F 56 CF
O F 58 1D              CALLL   SENDO
O F 58 D5
O F 60 42              TCY     4
O F 61 23              TYA
O F 62 10              BL      PF
O F 62 80
              *
              *
                       OPLA
              *OUTB    ----1=00000111
              *OUTB    ----0=00000000
                       ENDPLA
```

We claim:

1. A programmable wall switch for controlling the time for turning on and for turning off a light which comprises:
means for producing from the AC power line a selected DC voltage;
microprocessor means powered by said DC voltage, for turning on a light at any one of several selected times and for turning off said light at any one of an additional corresponding several selected times, said microprocessor means including means for incrementing said one of several selected times and one of said additional corresponding selected times by random amounts; and
means, responsive to signals from said microprocessor means, for displaying the time.

2. A programmable wall switch according to claim 1 wherein said switch includes control means for generating a signal and for supplying said signal to said microprocessor means thus allowing for manually overriding the operation of said light, through said microprocessor means, at any of several selected times of said switch, to provide a function programmed into said switch.

3. A programmable wall switch according to claim 2 wherein said means for displaying comprises means for electronically displaying the time and for electronically displaying the functions programmed into the programmable wall switch at selected times.

4. A programmable wall switch according to claim 1 wherein said means for incrementing comprises:

means employing a routine that takes the count of a selected counter and adds that count to the time to determine the time for turning on said light which results in a time randomly selected within a selected time period after said one of several selected times; and means employing a routine that takes the count of a selected counter and adds that count to the time to determine the time for turning off said light at a time within a range of time after said one of said additional corresponding several selected times, thereby to create a randomness in said turning on and turning off of said light which simulates the presence of occupants.

5. A programmable wall switch according to claim 1 wherein said
microprocessor means for turning on a light at any one of several selected times and for turning off the light at any one of an additional corresponding several selected times and said means for reducing the load current supplied to said light to one-half the load current applied during normal operation comprises
means for programming said light to turn on, turn off or dim up to a selected number of times per day.

6. A programmable wall switch according to claim 5 wherein said means for programming is capable of programming said light to turn on, off or dim up to eight times per day.

7. A programmable wall switch according to claim 6 including means for indicating on said means for displaying that said microprocessor means for producing a first output signal and for producing a second output signal have been programmed to cause said light to turn on, turn off or dim more than the allowed number of times per day.

8. A programmable wall switch according to claim 5 or 6 wherein said means for programming is capable of programming said light in any selected sequence to turn on, to dim and to turn off including the ability to turn said light fully on, then to dim said light and then to turn said light fully on again, and the ability to turn said light off, then dim and then off again.

9. A programmable wall switch according to claim 1 wherein said means for displaying the time includes, in addition, means for displaying an indicia that the power has failed and the structure needs to be reprogrammed.

10. A programmable wall switch according to claim 1 including
means for reviewing the times at which said microprocessor means for producing a first output signal and for producing a second output signal and said means for reducing the load current are programmed to operate so as to determine the sequence of activities programmed into said programmable wall switch.

11. A programmable wall switch according to clam 1 including electronic means for indicating that said switch is in the program mode.

12. A programmable wall switch according to claim 11 including
means for turning on said light prior to the setting of said programmable wall switch in the program mode, thereby to allow the user to view the wall switch as the wall switch is being programmed.

13. A programmable wall switch according to claim 1 including means for manually overriding the setting of said programmable wall switch to turn on, turn off or dim the light as desired.

14. A programmable wall switch according to claim 1 including
means for modifying the status of the program at any one or more of the preset times.

15. Structure as in claim 1 wherein said means for generating said signal at each zero crossing of the AC power line comprises
means for generating a first pulse having a first portion of a leading edge rising coincident with a first portion of a leading edge of a positive half cycle of a power signal on said AC power line, said first pulse then leveling off at a maximum voltage for the remainder of the positive half cycle of said power signal on said AC power line, and having a sharp drop in voltage to a minimum voltage point, coincident with what would be the zero voltage point of the trailing edge of said positive half cycle of said power signal, even if said trailing edge is not generated, said first pulse then remaining at said minimum voltage point for the duration of the negative half cycle of said AC line signal.

16. A programmable wall switch for controlling the time for turning on and for turning off a light which comprises:
means for producing from the AC power line a selected DC voltage;
microprocessor means powered by said DC voltage, for turning on a light at any one of several selected times and for turning off said light at any one of an additional corresponding several selected times;
said programmable wall switch including wall switch means for turning on said light, in response to the application of power to said programmable wall switch following absence or interruption of power which must then be turned off by occupant;
means, responsive to signals from said microprocessor means, for displaying the time;
means for generating a signal at each zero crossing of the AC power line and for supplying to said microprocessor means; and
means responsive to signals from said microprocessor means for reducing the load current supplied to said light to one-half the load current applied during normal operation, thereby to reduce the amount of current supplied to said light thus to save power, to extend the life of said light and to more realistically simulate human occupancy.

17. A programmable wall switch for controlling the time for turning on and for turning off a light which comprises:
means for producing from the AC power line a selected DC voltage;
microprocessor means powered by said DC voltage, for turning on a light at any one of several selected times and for turning off said light at any one of an additional corresponding several selected times;
means, responsive to signals from said microprocessor means, for displaying the time, said means for displaying the time includes, in addition, means for displaying an indicia that the power has failed and that the structure needs to be reprogrammed;
means for resetting the real time displayed on said means for displaying, said means for resetting comprising means for resetting at a first rate said real time and in response to said means for resetting being activated for greater than a first selected time, for accelerating the rate at which said real time is changed;

means for generating a signal at each zero crossing of the AC power line and for supplying said signal to said microprocessor means; and means responsive to signals from said microprocessor means for reducing the load current supplied to said light to one-half the load current applied during normal operation, thereby to reduce the amount of current supplied to said light thus to save power, to extend the life of said light and to more realistically simulate human occupancy.

* * * * *

UNITED STATES PATENT AND TRADEMARK OFFICE
CERTIFICATE OF CORRECTION

PATENT NO. : 4,521,843                                        Page 1 of 2
DATED       : July 31, 1985
INVENTOR(S) : D. Pezzolo, J.W. Pfeiffer, T.E. Corder It is certified that error appears in the above—identified patent and that said Letters Patent is hereby corrected as shown below:

Column 1, line 38, delete "swith" and substitute --switch--.

Column 2, line 21, delete "interferece" and substitute --interference--.

Column 3, line 53, delete "TR!" and substitute --TR1--.

Column 4, line 35, delete "the", second occurrence, insert -- then

Column 5, line 35, delete "circuity" and substitute --circuitry--.

Column 5, line 46, delete "ben" and substitute --been--.

Column 5, line 61, delete "then" and substitute --when--.

Column 6, line 47, delete "blub" and substitute --bulb--.

Column 11, line 44, delete "on" and substiute --in--.

Column 19, line 25, delete "p0 (24)".

UNITED STATES PATENT AND TRADEMARK OFFICE
CERTIFICATE OF CORRECTION

PATENT NO. : 4,521,843

DATED : July 31, 1985

INVENTOR(S) : D. Pezzolo, J.W. Pfeiffer, T.E. Corder

It is certified that error appears in the above—identified patent and that said Letters Patent is hereby corrected as shown below:

Column 20, line 66, the word should read --COLON--.

Signed and Sealed this

Nineteenth Day of November 1985

[SEAL]

Attest:

*Attesting Officer*

DONALD J. QUIGG

*Commissioner of Patents and Trademarks*